(12) United States Patent
Sakai et al.

(10) Patent No.: US 9,099,945 B2
(45) Date of Patent: Aug. 4, 2015

(54) LEAKAGE CURRENT REDUCING APPARATUS

(75) Inventors: Takuya Sakai, Tokyo (JP); Satoshi Azuma, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 364 days.

(21) Appl. No.: 13/818,860

(22) PCT Filed: Jun. 16, 2011

(86) PCT No.: PCT/JP2011/063815
§ 371 (c)(1),
(2), (4) Date: Feb. 25, 2013

(87) PCT Pub. No.: WO2012/026186
PCT Pub. Date: Mar. 1, 2012

(65) Prior Publication Data
US 2013/0147419 A1    Jun. 13, 2013

(30) Foreign Application Priority Data
Aug. 26, 2010 (JP) .................................. 2010-189119

(51) Int. Cl.
*H02P 1/46* (2006.01)
*H02M 5/45* (2006.01)
(Continued)

(52) U.S. Cl.
CPC ................. *H02P 6/002* (2013.01); *H02M 1/12* (2013.01); *H02M 1/44* (2013.01); *H02M 5/4585* (2013.01); *H02P 27/04* (2013.01); *H02M 2001/123* (2013.01)

(58) Field of Classification Search
CPC ........... H02P 6/002; H02P 6/10; H02P 27/04; H02M 5/45; H02M 5/00; H02M 1/12; H02M 1/44; H02M 5/4585; H02M 2001/123

USPC ...................... 318/722, 400.1–400.42; 363/37
See application file for complete search history.

(56) References Cited

U.S. PATENT DOCUMENTS 4,172,991 A  * 10/1979  Akamatsu et al. ............ 318/722
6,667,685 B2    12/2003  Wasaki et al.
(Continued)

FOREIGN PATENT DOCUMENTS

| CN | 1394387 A | 1/2003 |
|----|-----------|--------|
| JP | 62 25827  | 2/1987 |

(Continued)

OTHER PUBLICATIONS

Japanese Office Action Issued Dec. 11, 2012 in JP Patent Application No. 2012-530567 (with English abstract).
(Continued)

*Primary Examiner* — Bentsu Ro
*Assistant Examiner* — Zemenay Truneh
(74) *Attorney, Agent, or Firm* — Oblon, McClelland, Maier & Neustadt, L.L.P.

(57) ABSTRACT

In a system supplying power from an AC power supply to a three-phase motor via a converter and an inverter, a leakage current reducing apparatus is connected to a connection line between the AC power supply and the converter. A common mode transformer detects, as common mode voltage, common mode current flowing from the AC power supply to the connection line. The common mode voltage is inputted to a voltage amplifier via a filter apparatus. Output voltage obtained by voltage amplification passes through a capacitor and then is applied as an AC component to a neutral point of capacitors connected in a Y-connection fashion, so as to have the same phase as that of the common mode voltage. Thus, current having the same phase as that of the common mode current is supplied via the capacitors to the converter through the connection line, thereby reducing the common mode current.

14 Claims, 12 Drawing Sheets

(51) Int. Cl.
*H02P 6/00* (2006.01)
*H02M 1/12* (2006.01)
*H02M 1/44* (2007.01)
*H02M 5/458* (2006.01)
*H02P 27/04* (2006.01)

(56) References Cited

U.S. PATENT DOCUMENTS

2008/0019155 A1* 1/2008 Morishima et al. ............. 363/37
2011/0317455 A1  12/2011 Azuma et al.

FOREIGN PATENT DOCUMENTS

| JP | 7 115339 | 5/1995 |
| JP | 9 215341 | 8/1997 |
| JP | 2002 204189 | 7/2002 |
| JP | 2003 88099 | 3/2003 |
| JP | 2006 333647 | 12/2006 |
| JP | 2010 57268 | 3/2010 |
| WO | 2010 100934 | 9/2010 |

OTHER PUBLICATIONS

International Search Report Issued Sep. 20, 2011 in PCT/JP11/63815 Filed Jun. 16, 2011.
U.S. Appl. No. 14/368,182, filed Jun. 23, 2014, Sakai, et al.
Combined Chinese Office Action and Search Report issued on Oct. 31, 2014 in Patent Application No. 201180047842.7 with partial English translation and English translation of categories of cited documents.

* cited by examiner

LEAKAGE CURRENT REDUCING APPARATUS

TECHNICAL FIELD

The present invention relates to a leakage current reducing apparatus which reduces leakage current occurring in, for example, a power conversion apparatus or the like which is connected to an AC power supply and outputs given AC voltage.

BACKGROUND ART

As a conductive noise filter that is a conventional leakage current reducing apparatus, for example, a conductive noise filter is disclosed that is applicable to a system having a rectifier which converts the output of an AC power supply to DC voltage and a power converter for converting the DC voltage to AC voltage by switching operation of a semiconductor device for power, the conductive noise filter including: a common mode voltage detection circuit which is provided between the ground and a neutral point of ground capacitors connected in a Y-connection fashion to three-phase lines between the AC power supply and the rectifier, and detects common mode voltage occurring upon switching operation of the semiconductor device for power; an operational amplifier which amplifies the detected common mode voltage; and a cancelling voltage source which generates cancelling voltage having the same level as the common mode voltage and having an opposite polarity thereto, and superimposes the cancelling voltage onto the lines between the AC power supply and a connection point of the ground capacitors, thereby cancelling the common mode voltage (for example, see Patent Document 1).

CITATION LIST

Patent Document

Patent Document 1: Japanese Laid-Open Patent Publication No. 2010-057268 (paragraphs [0018] to [0023] and FIG. 1)

SUMMARY OF THE INVENTION

Problems to be Solved by the Invention

The conventional leakage current reducing apparatus is configured as described above and needs the common mode voltage detection circuit which detects high-frequency common mode voltage, the operational amplifier which amplifies the detected common mode voltage, and the cancelling voltage source which cancels the high-frequency common mode voltage by injecting the corresponding high-frequency common mode voltage. However, since phase error on the operational amplifier or the common mode voltage detection circuit directly appears on the cancelling voltage source, a problem arises that noise cannot be suppressed effectively. In addition, in this circuit method, a frequency that maximizes the amplification factor (hereinafter, referred to as a gain) of the operational amplifier coincides with a frequency at which the phase inverts due to characteristics such as delay time of an amplifier circuit that includes the operational amplifier (resulting in amplification of noise). Then, if the gain of the amplifier circuit is increased in order to reduce noise, a problem arises that a stable operation cannot be obtained.

The present invention has been made to solve the above problems and an object thereof is to obtain a leakage current reducing apparatus that can effectively reduce leakage current.

Solution to the Problems

A leakage current reducing apparatus according to the present invention is provided between a first electric apparatus and a second electric apparatus, via a plurality of connection lines connected between the first and the second electric apparatuses, and reduces leakage current flowing from the first electric apparatus to the connection lines. In addition, the leakage current reducing apparatus includes: a voltage detection section which detects, as detected voltage, the leakage current flowing from the first electric apparatus to the connection lines; a filter apparatus which receives the detected voltage; a voltage amplifier which amplifies the output of the filter apparatus and outputs the amplified voltage as output voltage; and a current supply section which is provided, on the second electric apparatus side with respect to the voltage detection section, between the first and the second electric apparatuses, and supplies current having substantially the same phase as the phase of the leakage current, to the connection lines. Further, the current supply section has a plurality of injection capacitors whose terminals on one side are connected to the connection lines and whose terminals on the other side are commonly connected to a common connection point, and applies the output voltage to the common connection point, thereby supplying the current having substantially the same phase as the phase of the leakage current from the injection capacitors to the connection lines.

Effect of the Invention

According to the present invention, since the current supply section supplies current having substantially the same phase as that of leakage current to the connection lines on the second electric apparatus side with respect to the voltage detection section, the supplied current becomes leakage current flowing from the connection lines to the second electric apparatus, whereby leakage current flowing through the connection lines from the first electric apparatus can be effectively reduced. In addition, since the current supply section supplies current having substantially the same phase as that of leakage current to the connection lines by applying the output voltage of the voltage amplifier to the common connection point of the plurality of injection capacitors, the current can be supplied easily and reliably. Further, since the filter apparatus is provided on the input side of the voltage amplifier, it becomes possible to adjust a factor of increasing leakage current and increase the gain of the voltage amplifier for a frequency as a noise elimination target, whereby leakage current can be reduced reliably and effectively.

In addition, since current is supplied to the connection lines by using the injection capacitors in the current supply section, the injection capacitors can be used for a high-pass filter. Then, by adjusting the constant thereof, the voltage amplifier can be protected and current output in a low-frequency band can be reduced.

DESCRIPTION OF EMBODIMENTS

Embodiment 1

Figure 1:
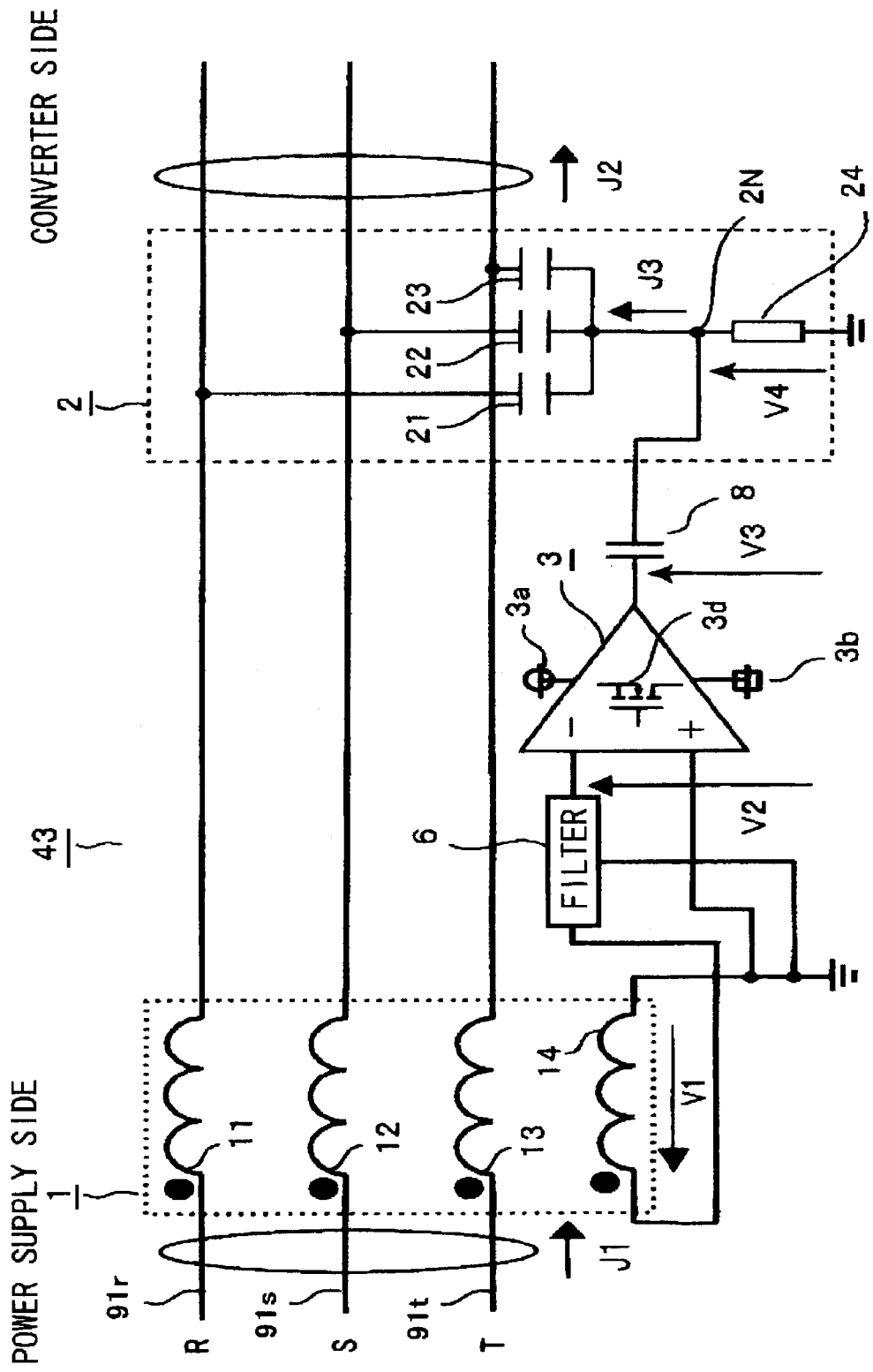
FIG. 1 is a configuration diagram showing a high-frequency leakage current reducing apparatus according to embodiment 1 of the present invention.
Figure 2:
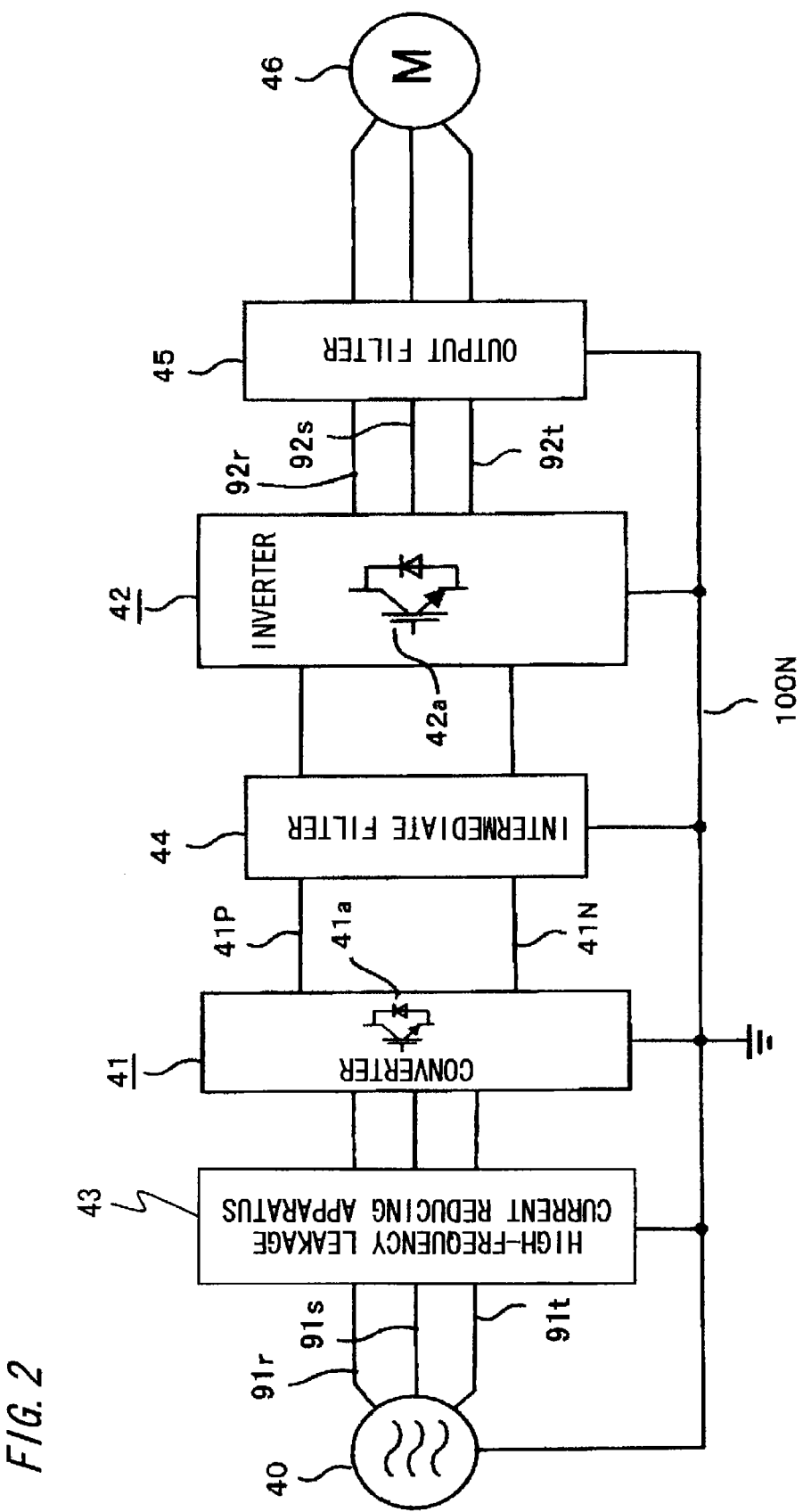
FIG. 2 is a connection diagram showing a connection example of the high-frequency leakage current reducing apparatus according to embodiment 1 of the present invention.
Figure 3:
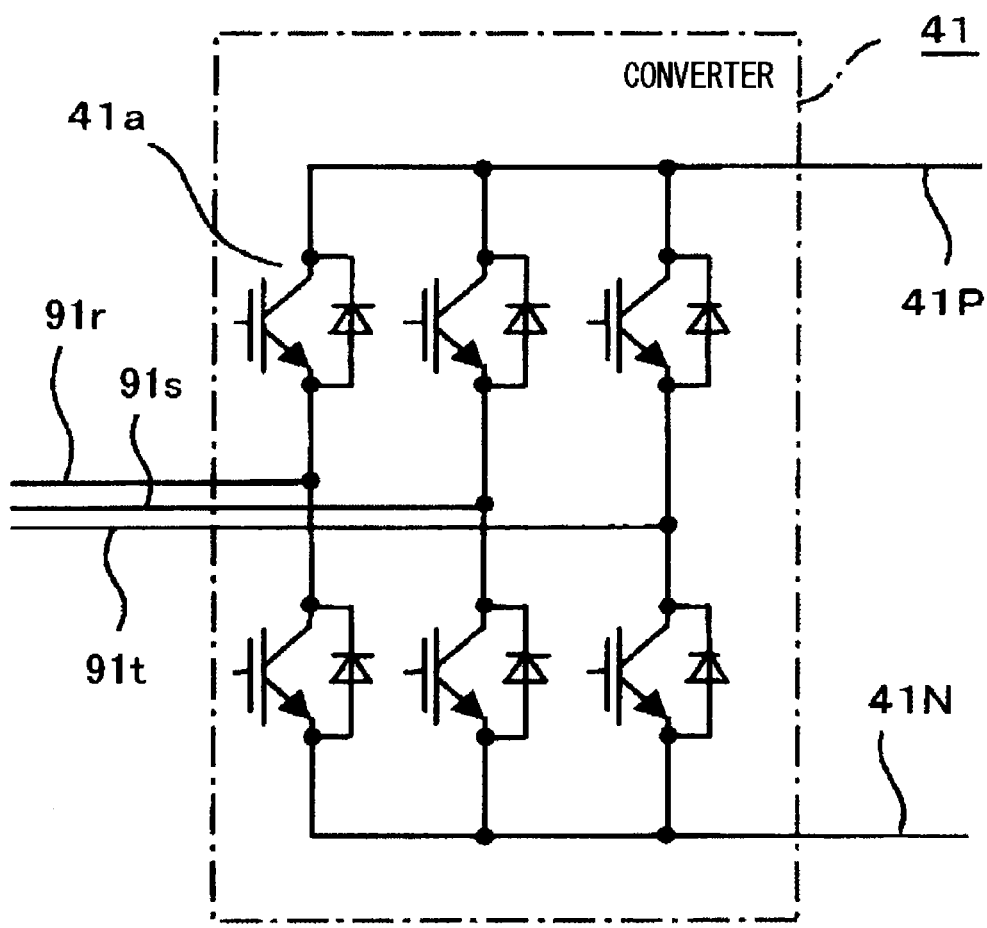
FIG. 3 is a circuit diagram showing the details of a converter according to embodiment 1 of the present invention.
Figure 4:
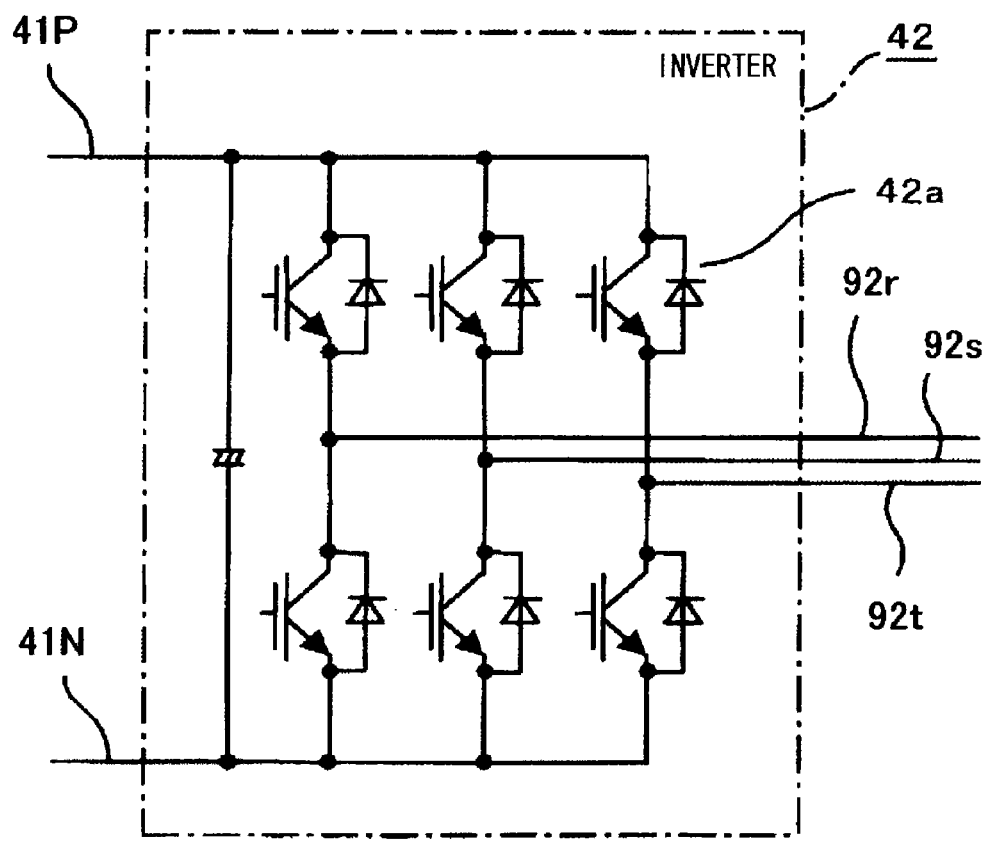
FIG. 4 is a circuit diagram showing the details of an inverter according to embodiment 1 of the present invention.
Figure 5:
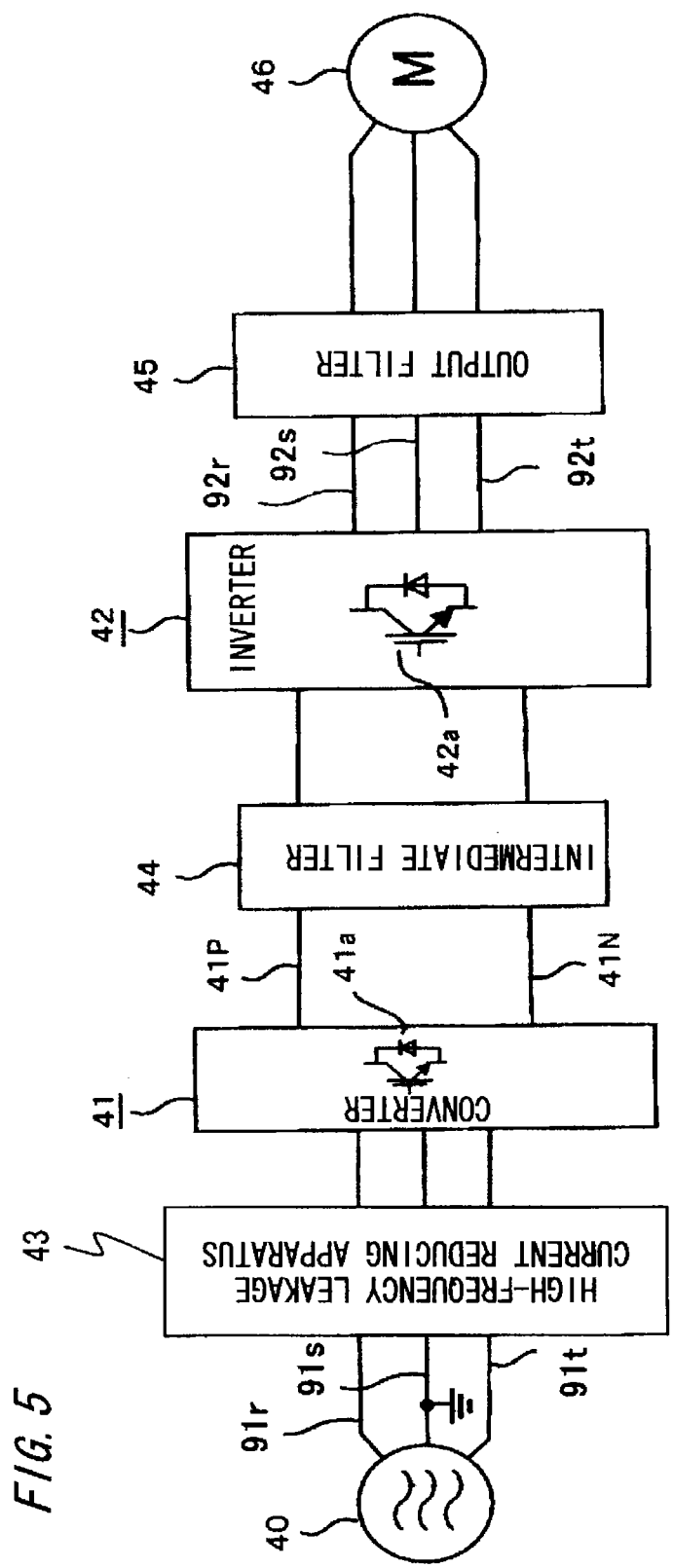
FIG. 5 is a configuration diagram showing the case where one phase is grounded, in the high-frequency leakage current reducing apparatus according to embodiment 1 of the present invention.

FIGS. 1 to 5 show embodiment 1 for carrying out the present invention. Specifically, FIG. 1 is a configuration diagram showing the configuration of a high-frequency leakage current reducing apparatus. FIG. 2 is a connection diagram showing a connection example of the high-frequency leakage current reducing apparatus. FIG. 3 is a circuit diagram showing the detailed configuration of a converter. FIG. 4 is a circuit diagram showing the details of an inverter. FIG. 5 is a configuration diagram showing the case where one phase is grounded in the high-frequency leakage current reducing apparatus in FIG. 1.

In FIG. 1, a high-frequency leakage current reducing apparatus 43 as a leakage current reducing apparatus includes a common mode transformer 1 as a voltage detection section, a current injection circuit 2 as a current supply section, a filter apparatus 6, and a voltage amplifier 3.

The high-frequency leakage current reducing apparatus 43 is provided between an AC power supply 40 as a first electric apparatus and a converter 41 as a second electric apparatus, via three-phase connection lines 91$r$, 91$s$, and 91$t$ connecting the AC power supply 40 and the converter 41, and reduces common mode current J1 which is high-frequency leakage current flowing from the AC power supply 40 to the connection lines 91$r$, 91$s$, and 91$t$.

The common mode transformer 1 has three-phase windings 11, 12, and 13 as main windings, and a winding 14 for common mode voltage detection as a winding for voltage detection. The main windings 11, 12, and 13 of the common mode transformer 1 are connected in series to the connection lines 91$r$, 91$s$, and 91$t$, and the current injection circuit 2 is connected to the connection lines 91$r$, 91$s$, and 91$t$ on the converter side with respect to the common mode transformer 1.

The windings 11, 12, and 13 and the winding 14 are each composed of a predetermined number of turns (in the present embodiment, five turns) of wire wound on an iron core not shown. It is noted that the windings 11 to 14 are wound so as to have polarities indicated by black filled circles in FIG. 1. An output from the winding 14 for common mode voltage detection is supplied to the positive input terminal of the voltage amplifier 3 via the filter apparatus 6, and the voltage of the supplied output is amplified by a semiconductor switching device as an amplifying device, e.g., an FET (Field Effect Transistor) 3$d$. The amplified voltage is applied as output voltage, via an output capacitor 8, to the connection point between a neutral point 2N of capacitors 21, 22, and 23 as capacitors for injection described later and a ground resistor 24 as an impedance device. It is noted that one terminal of the winding 14 for common mode voltage detection is grounded.

The current injection circuit 2 is, in the present embodiment, composed of the capacitors 21, 22, and 23 for common mode voltage application and the ground resistor 24 which are connected to each other. Specifically, terminals on one side of the capacitors 21, 22, and 23 are respectively connected to the three-phase connection lines 91$r$, 91$s$, and 91$t$, and terminals on the other side are commonly connected to the neutral point 2N in a Y-connection fashion. The neutral point 2N is grounded via the ground resistor 24. By providing the ground resistor 24, it becomes possible to prevent the potential of the neutral point 2N of the capacitors 21, 22, and 23 from becoming unstable due to influence of normal mode noise or the like, thereby stabilizing the potential of the neutral point 2N. Also, a high-pass filter can be formed by the output capacitor 8 and the ground resistor 24, so as to have a function of preventing injection of power having a frequency lower than a standard frequency.

It is noted that as a modification of the current injection circuit 2, a capacitor as an impedance device may be provided instead of the ground resistor 24. In addition, the ground resistor 24 may be removed so that the output of the voltage amplifier 3 may be merely connected to the neutral point 2N of the capacitors 21, 22, and 23.

The common mode transformer 1 detects common mode voltage V1 caused by the common mode current J1. A phenomenon that the voltage amplifier 3 amplifies the common mode current J1 occurs at a phase inverting frequency at which, due to characteristics such as the delay time of an operational amplifier (not shown) included in the filter apparatus 6 or the voltage amplifier 3, the phase of current outputted by the voltage amplifier 3 inverts from the phase of the common mode current J1, or at a resonance frequency with the impedance of the lines or the detection transformer. However, the phase inverting frequency and the resonance frequency can be adjusted by adjustment of the capacitances of the capacitors 21, 22, and 23. Thus, these frequencies can be separated from a frequency as a reduction target defined by a noise standard.

The voltage amplifier 3 has power supply terminals 3$a$ and 3$b$ and an operational amplifier, and the operational amplifier has an FET 3$d$ as an amplifying device for voltage amplification. The voltage amplifier 3 is supplied with operation power from an external power supply (not shown) via the power supply terminals 3$a$ and 3$b$. The common mode voltage V1 detected by the winding 14 for common mode voltage detection is inputted to the voltage amplifier 3 via the filter apparatus 6 so that the voltage of the input is amplified, and then the amplified voltage is applied as an AC component V4, via the output capacitor 8, to the neutral point 2N of the capacitors 21, 22, and 23 connected in a Y-connection fashion (the details will be described later).

It is noted that the filter apparatus 6 is composed of one or a plurality of filter circuits connected in parallel or in series. By adjusting constants of the filter circuits, the respective pass frequency ranges are adjusted, and the amplitude ratio and the phase difference between the detected common mode voltage V1 and the output voltage V2 of each filter circuit are adjusted at each pass frequency.

In the setting of the filter apparatus 6, the amplitude and the phase of a detected value (common mode voltage V1) are adjusted for each frequency by, for example, a combination of a plurality of high-pass filters and low-pass filters, thereby increasing the noise reduction effect for a frequency at which noise occurs at a large level.

As shown in FIG. 2, the high-frequency leakage current reducing apparatus 43 configured as described above is provided between the AC power supply 40 and the converter 41 via the connection lines 91r, 91s, and 91t in a system that supplies power from the AC power supply 40 to a three-phase motor 46 as a load.

AC power from the AC power supply 40 is inputted to the converter 41 through the connection lines 91r, 91s, and 91t via the high-frequency leakage current reducing apparatus 43. As shown in FIG. 3, the converter 41 is composed of IGBTs 41a as semiconductor switching devices, to which diodes are connected in anti-parallel and which are connected in a three-phase full bridge fashion. Then, the converter 41 converts three-phase AC current to variable-voltage DC current, through open/close control for the IGBTs 41a. The output of the converter 41 is inputted to the inverter 42 through connection lines 41P and 41N as DC bus lines via an intermediate filter 44 having a capacitor not shown.

As shown in FIG. 4, the inverter 42 is composed of IGBTs 42a as semiconductor switching devices, to which diodes are connected in anti-parallel and which are connected in a three-phase full bridge fashion. Then, the inverter 42 converts DC current to variable-voltage and variable-frequency three-phase AC current, through open/close control for the IGBTs 41a by a PWM signal generated by magnitude comparison between a phase voltage instruction and a carrier as a triangular wave or a saw-tooth wave having a predetermined frequency. Then, the output of the inverter 42 is supplied to the three-phase motor 46 through connection lines 92r, 92s, and 92t as an AC output line via an output filter 45.

A system is composed of the AC power supply 40, the converter 41, the intermediate filter 44, the inverter 42, the output filter 45, and the three-phase motor 46 described above. It is noted that the AC power supply 40 has a ground floating capacitance. In addition, as is known in the art, frames or housings (not shown) of the converter 41, the intermediate filter 44, the inverter 42, the output filter 45, and the three-phase motor 46 are grounded (GND) and have ground floating capacitances, and common mode current flows via each ground floating capacitance. The grounded situation is represented by a ground line 100N in FIG. 2.

Next, the operation will be described. The common mode transformer 1, by using the winding 14 for common mode voltage detection, detects the common mode voltage V1 generated by the common mode current J1 flowing from the AC power supply 40 to the three-phase connection lines 91r, 91s, and 91t, i.e., the windings 11, 12, and 13. In general, the frequency band of common mode current is 150 kHz to 30 MHz. However, the detection can be performed without being limited to the above frequency band. It is noted that the common mode voltage V1 is generated in proportion to the common mode inductance (the turns ratios of the windings 11, 12, and 13 and the winding 14) of the common mode transformer 1. The common mode voltage V1 is inputted to the filter apparatus 6, and the voltage V2 is generated by the filter apparatus 6.

The filter apparatus 6 is composed of at least one filter circuit, and is set so as to decrease the gain (amplitude ratio) for, of the frequency components of the common mode voltage V1 which is detected voltage, a frequency component such as a frequency lower than a carrier frequency of the inverter 42, a frequency out of a frequency range defined by the standard, or a frequency that causes resonance due to the impedance of the system or the impedance of a common mode reactor or a filter capacitor, for example. Alternatively, the gain and the phase for each frequency of the filter apparatus 6 is adjusted, e.g., the gain for a frequency as a noise reduction target is adjusted to increase.

The voltage V2 inputted to the voltage amplifier 3 is amplified by a factor of the gain (G) in the voltage amplifier 3, and then outputted as output voltage V3. A DC component of the output voltage V3 is eliminated by the output capacitor 8, and then voltage V4 which is an AC component of the output voltage V3 is applied to the neutral point 2N of the capacitors 21, 22, and 23 of the current injection circuit 2. The voltage V4 is generated so as to have the same phase as that of the common mode voltage V1. Thus, the voltage amplifier 3 adjusts the output voltage V3 such that current J3 (FIG. 1) having the same phase and the same magnitude as those of the common mode current J1 which is high-frequency leakage current is supplied through the capacitors 21, 22, and 23 to the connection lines 91r, 91s, and 91t. It is noted that current having the same phase refers to current whose phase coincides with the phase of current component having a reduction target frequency, of the high-frequency leakage current (common mode current J1).

That is, in FIGS. 1 and 2, the common mode voltage V1 generated by the common mode current J1 is detected by the common mode transformer 1 and then inputted to the filter apparatus 6. Then, the common mode voltage V1 is adjusted with respect to the gain and the phase for each frequency by the filter apparatus 6, and is inputted as the voltage V2 to the voltage amplifier 3. Then, the output voltage V3 obtained by amplifying the voltage V2 by a factor of G in the voltage amplifier 3 passes through the output capacitor 8, whereby a DC component of the output voltage V3 is eliminated. Then, the voltage V4 which is an AC component is applied to the neutral point 2N of the capacitors 21, 22, and 23 of the current injection circuit 2, thereby changing the inter-terminal voltages of the capacitors 21, 22, and 23. Thus, the current J3 having the same phase as that of the common mode current J1 is supplied to the converter 41 through the connection lines 91r, 91s, and 91t.

It is noted that the above-described matter is equivalent to that the inductance of the common mode transformer 1 is amplified by a factor of the gain adjusted for each frequency by the filter apparatus 6 and the voltage amplifier 3, and the resultant inductance is generated between the common mode transformer 1 and the current injection circuit 2. Thus, flow of common mode current from the converter 41 to the AC power supply 40 is reduced.

At this time, the voltage amplifier 3 controls the output voltage V3 through open/close control for the FET 3d so as to make the common mode current J1 approach zero. Therefore, most of the common mode current J2 flowing from the connection lines 91r, 91s, and 91t to the converter 41 is supplied as the current J3 from the voltage amplifier 3 via the current injection circuit 2, so that the common mode current J1 flowing from the AC power supply 40 to the connection lines 91r, 91s, and 91t can be reduced to substantially zero.

Thus, at the frequency sorted by the filter apparatus 6 or the output capacitor 8, the common mode current J2 is injected to the connection lines 91r, 91s, and 91t in the system through the capacitors 21, 22, and 23 of the current injection circuit 2, and then supplied to the converter 41. Therefore, the common mode current J1 flowing to the three-phase windings 11, 12, and 13 of the common mode transformer 1 can be suppressed.

In addition, since a simple amplifier circuit using, for example, an operational amplifier, can be applied to the voltage amplifier 3, the configuration thereof can be simplified.

Further, by using a transformer (common mode transformer 1) for detecting the common mode voltage V1, the filter apparatus 6 and the voltage amplifier 3 can be insulated from the connection lines 91r, 91s, and 91t which are the AC output lines of the system, and only noise that is a frequency component as a reduction target can be detected through the filter apparatus 6. Therefore, since the electronic components used for the filter apparatus 6 and the voltage amplifier 3 do not need to have high breakdown voltages, reduction of the size and the cost of an apparatus can be realized.

It is noted that depending on the occurrence condition of noise and the connection condition of the high-frequency leakage current reducing apparatus 43, the output capacitor 8 or the filter apparatus 6 may be omitted.

In addition, regarding the detection of the common mode voltage V1 by the common mode transformer 1, the input impedance of the voltage amplifier 3 is set at a large value so as to accurately detect the both-end voltage of the winding 14. This is because decrease in the input impedance deteriorates the detection accuracy for the common mode voltage V1.

In a conventional example, since a capacitor is used for detection of common mode current, when high-frequency common mode current is detected, the impedance of a detection circuit decreases, and the common mode voltage V1 hardly occurs. Therefore, it is difficult to detect small common mode current or common mode current in a high-frequency band. On the other hand, in the present embodiment, voltage is detected by the common mode transformer 1 in the state where the common mode voltage is generated. Therefore, noise reduction effect due to the common mode impedance generated by the common mode transformer 1 is superimposed, thereby providing further increased noise reduction effect.

The common mode voltage V1 also includes noise of frequency components such as: a phase inverting frequency at which, due to characteristics such as the impedance of a circuit to which the voltage amplifier 3 is connected and the delay time of the operational amplifier (not shown) included therein, the phase of the output voltage V3 of the voltage amplifier 3 (operational amplifier) inverts from the phase of the detected common mode voltage V1; a resonance frequency due to the impedance of the lines, the common mode transformer 1, or the like; and when the inverter 42 is connected, a low-frequency region such as a frequency close to the carrier frequency of the inverter 42, which does not need to be eliminated. In the filter apparatus 6, the gains for the above frequency bands are decreased by the filter apparatus 6, whereby only noise in a frequency band as a reduction target can be reduced without amplifying noise.

In addition, by adjusting the constant of the filter apparatus 6, it is possible to adjust the phase inverting frequency at which the phase of the output current outputted from the voltage amplifier 3 due to characteristics such as the delay time of the operational amplifier or the like inverts from the phase of the common mode current flowing in the common mode transformer 1. Thus, tolerance is obtained for the gain in a frequency band at which the phase inverts, and the gain of the voltage amplifier 3 for noise in a frequency band as a reduction target can be set to be large, whereby stable operation can be performed and noise current can be efficiently reduced. Regarding the above frequency band, the filter constant is adjusted such that the frequency band becomes, for example, a frequency band equal to or higher than 150 kHz which is a frequency band defined by the noise standard, or a frequency band with a great need of noise reduction based on a result of measurement of noise of the system or the bus lines. Thus, noise due to leakage current in such frequency bands can be effectively reduced.

In addition, in order to adjust the phase of the common mode voltage V1 and supply the adjusted voltage to the filter apparatus 6, an input capacitor may be provided at the preceding stage of the filter apparatus 6 and a resistor may be provided between the GND and the line connecting the input capacitor and the output of the winding 14 for common mode voltage detection, whereby only an AC component of the common mode voltage V1 may be inputted to the filter apparatus 6.

In addition, in the case where one phase of an input system is grounded as shown in FIG. 5 (the case of S-phase is shown), the power supply voltage is applied to the operational amplifier output. In this case, if a high-pass filter having a frequency band equal to or higher than the power supply frequency is provided for the operational amplifier output, the voltage amplifier 3 can be protected from the above voltage, and harmonic common mode current (current J3) can be injected to the system. The high-pass filter is formed by the output capacitor 8 and a resistor connected between the output terminal and the ground terminal in the voltage amplifier 3. Alternatively, the high-pass filter may be formed by the output capacitor 8 and the output resistor of the voltage amplifier 3.

In addition, in the case where one phase of a power supply system to which equipment is connected is grounded, the constants of the capacitors 21 to 23 and the ground resistor 24 of the current injection circuit 2 may be adjusted such that an injection circuit constant to the output of the voltage amplifier 3 as seen from the system corresponds to a high-pass filter having a frequency band equal to or higher than the power supply frequency, whereby the voltage amplifier 3 may be protected from the above voltage, and harmonic common mode current (current J3) may be injected to the system. In this case, since a DC component is prevented from being outputted to the system by the capacitors 21 to 23 of the current injection circuit 2, the output capacitor 8 may be omitted.

In addition, when power is applied to the system or when voltage abnormality between phases occurs, an abnormal voltage occurs at the neutral point 2N of the current injection circuit 2. In order to protect the voltage amplifier 3 from the abnormal voltage, a protection circuit composed of a zener diode, a resistor, and the like is provided between the earth and any position between the voltage amplifier 3 and the current injection circuit 2. Thus, the voltage amplifier 3 can be protected from the abnormal voltage in the above situation.

It is noted that as shown in FIG. 2, if the high-frequency leakage current reducing apparatus 43 is provided between the AC power supply 40 and the converter 41, all common mode currents generated by the converter 41 and the inverter 42 become suppression targets. Therefore, noise propagation to the AC power supply 40 can be effectively suppressed.

Recently, as switching devices such as the IGBTs 41a of the converter 41 and the IGBTs 42a of the inverter 42, switching devices composed of wide bandgap semiconductors formed by silicon carbide (SiC), gallium-nitride-based materials, diamond, or the like, are used. As a result, the speed of switching operation is further increasing, but the occurrence amount of noise also tends to increase along with the increase in the speed. In spite of such a problem as described above, the high-frequency leakage current reducing apparatus 43 of the present embodiment can reduce high-frequency leakage current irrespective of the types of switching devices, and operate so as to reduce the caused noise. Therefore, it is possible to effectively reduce noise caused by switching devices formed by silicon carbide or the like which perform high-speed switching operation. In addition, similarly, even in the case where the operational amplifier of the voltage amplifier 3 uses the FET 3d formed by a wide bandgap semiconductor or the like such as silicon carbide, gallium-nitride-based materials, or diamond, it is possible to reduce the influence of noise occurrence and reduce high-frequency leakage current having large energy.

It is noted that in the case of using a wide bandgap semiconductor such as silicon carbide, gallium-nitride-based materials, or diamond for the switching devices of the converter 41, the inverter 42, and the like, it is considered that interruption speed of voltage or current upon switching operation increases, and high-frequency leakage current increases. Therefore, it is effective to increase the operation speed by using, as constituent devices of a noise reducing apparatus, an operational amplifier using a wide bandgap semiconductor.

Embodiment 2

Figure 6:
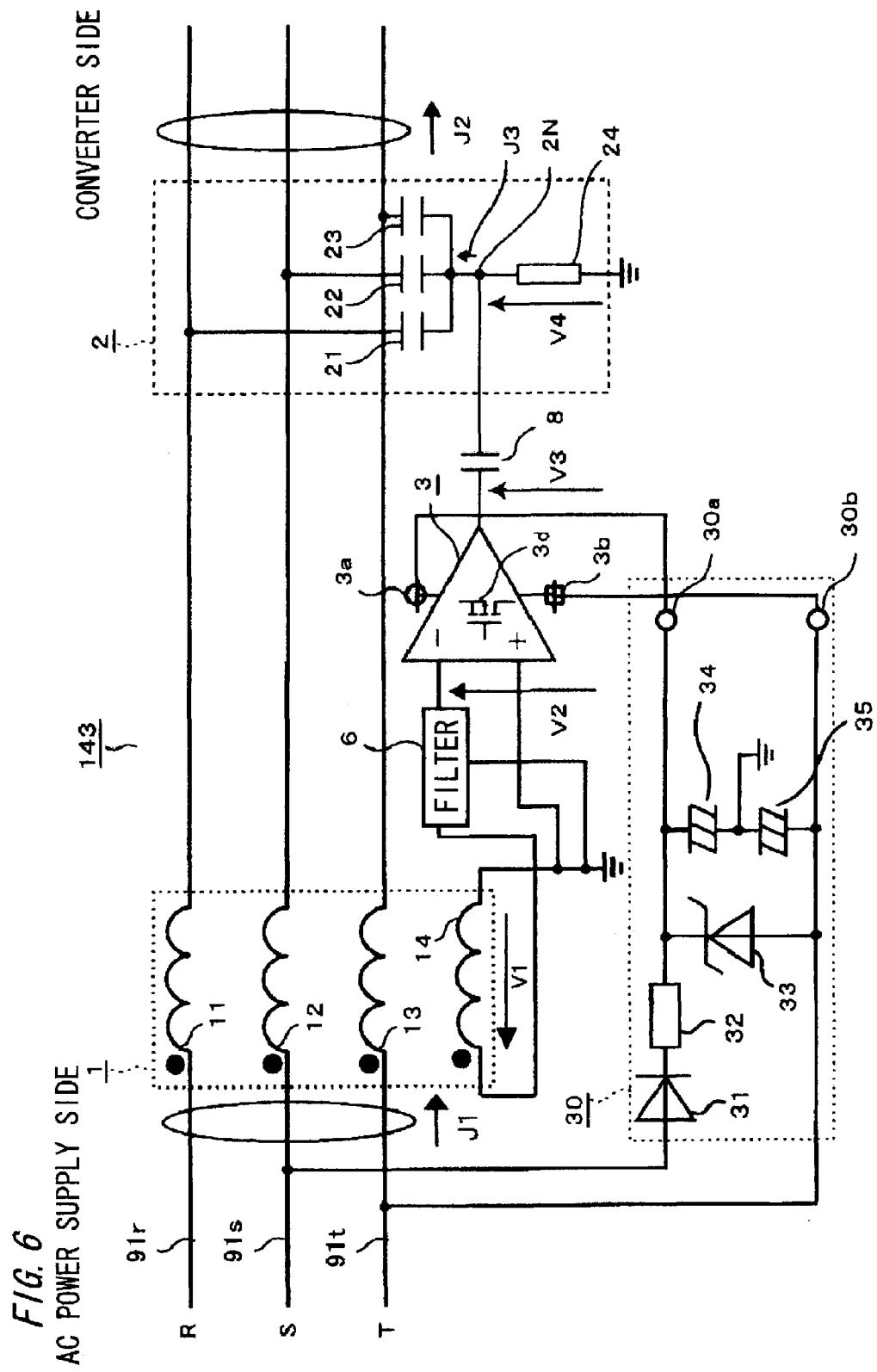
FIG. 6 is a configuration diagram showing a high-frequency leakage current reducing apparatus according to embodiment 2 of the present invention.

FIG. 6 is a configuration diagram showing the configuration of a high-frequency leakage current reducing apparatus according to embodiment 2. In FIG. 6, a high-frequency leakage current reducing apparatus 143 as a leakage current reducing apparatus is used instead of the high-frequency leakage current reducing apparatus 43 shown in FIG. 2, and has a rectification power supply apparatus 30. The rectification power supply apparatus 30 converts AC power from the connection lines 91s and 91t to DC voltages at two levels of a positive one and a negative one, and supplies the DC voltages as operation power to the voltage amplifier 3. In the rectification power supply apparatus 30, the anode side of a diode 31 is connected to the S-phase connection line 91s, and the cathode side is connected via a resistor 32 to a capacitor 34 side of a series circuit composed of the capacitor 34 and a capacitor 35. The capacitor 35 side of the series circuit of the capacitor 34 and the capacitor 35 is connected to the T-phase connection line 91t, and the connection point between the capacitor 34 and the capacitor 35 is grounded. In addition, a zener diode 33 is connected in parallel to the series circuit of the capacitor 34 and the capacitor 35, and is connected to DC voltage terminals 30a and 30b.

AC voltage generated between the S-phase and T-phase connection lines 91s and 91t is processed through half-wave rectification by the diode 31, and then divided by the resistor 32 and the zener diode 33, thereby obtaining two DC voltages having different voltage levels for driving the voltage amplifier 3 on both DC voltage terminals 30a and 30b of the series circuit of the capacitor 34 and the capacitor 35. The DC voltage terminals 30a and 30b are connected to the power supply terminals 3a and 3b of the voltage amplifier 3, to supply operation power to the voltage amplifier 3. The other configuration is the same as that of embodiment 1 shown in FIGS. 1 to 4. Therefore, the corresponding components are denoted by the same characteristics, and the description thereof is omitted.

In the present embodiment, since DC power supply for driving the voltage amplifier 3 is obtained by receiving AC power from the connection lines 91s and 91t, it is not necessary to supply power separately. In addition, in the present embodiment, since the voltage is adjusted by the zener diode 33, an insulation transformer or a converter is not needed, so that the size and the cost of a power supply section can be reduced. The voltage adjustment method is not limited to the above method, but may supply controlled power from the connection lines by an insulation transformer or a DC/DC converter.

In the reception of AC power from the connection lines 91s and 91t, it is desirable that the rectification power supply apparatus 30 receives AC power from the connection lines 91s and 91t on the AC power supply 40 side. If the power reception point is on the AC power supply 40 side with respect to the current injection circuit 2, the common mode current J1 flowing in the connection lines 91s and 91t has been reduced. Therefore, noise flowing into the voltage amplifier 3 via the rectification power supply apparatus 30 can be reduced, and the reliability of the high-frequency leakage current reducing apparatus 143 is improved.

In addition, although in FIG. 6, the DC power supply for driving the voltage amplifier 3 is obtained from the AC power supply 40 by using the connection lines 91s and 91t, a DC power supply may be obtained through rectification from the connection lines 91r, 91s, and 91t, whereby the same effect can be provided.

Further, power can be also received from a connection line other than the connection lines 91s and 91t on the AC power supply 40 side. Specifically, a plurality of capacitors similar to the capacitors 34 and 35, or a series circuit composed of a resistor and a zener diode, may be connected between the connection lines 41P and 41N on the output side of the capacitor 41, to obtain a DC power supply.

Embodiment 3

Figure 7:
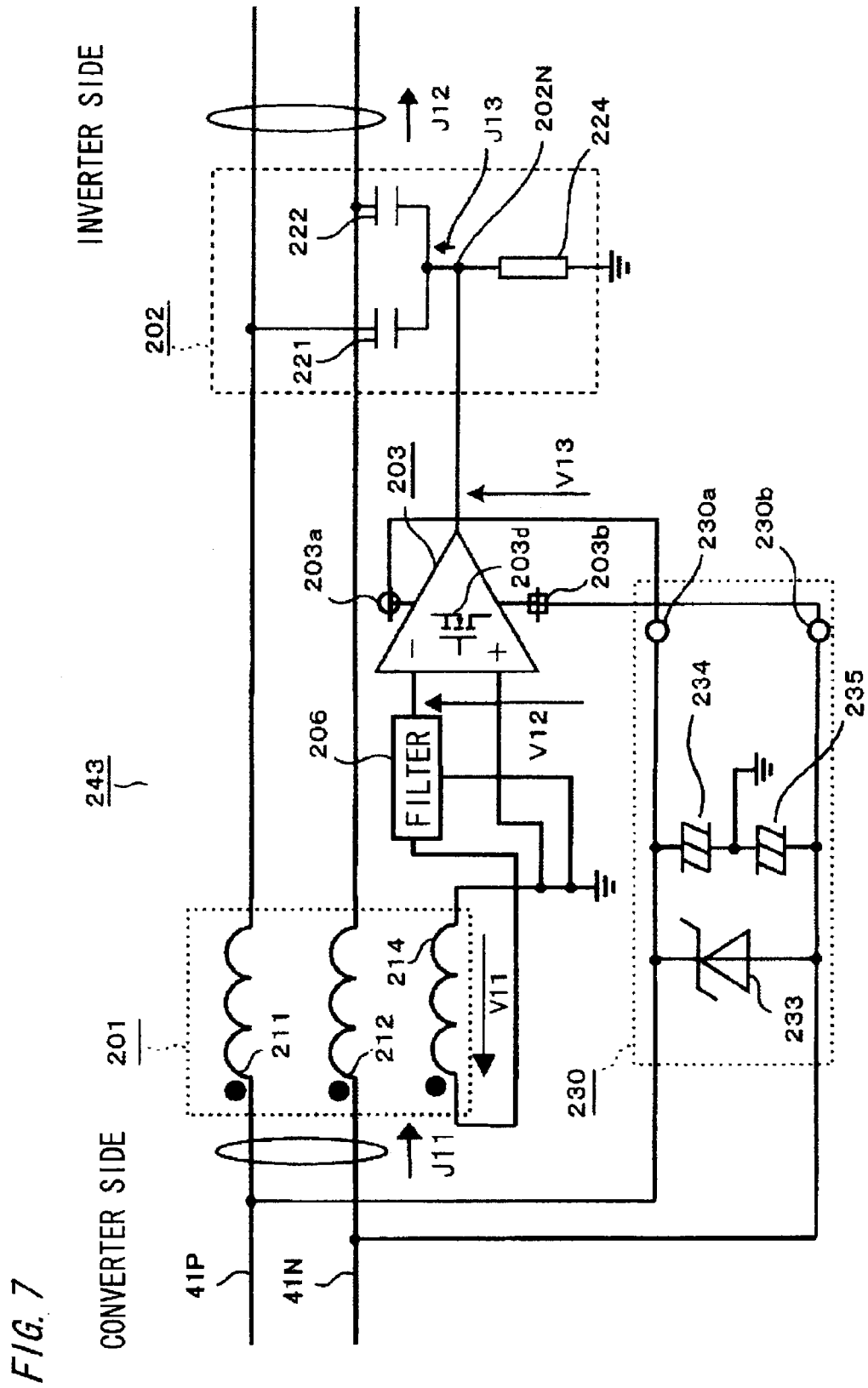
FIG. 7 is a configuration diagram showing the configuration of a high-frequency leakage current reducing apparatus according to embodiment 3 of the present invention.
Figure 8:
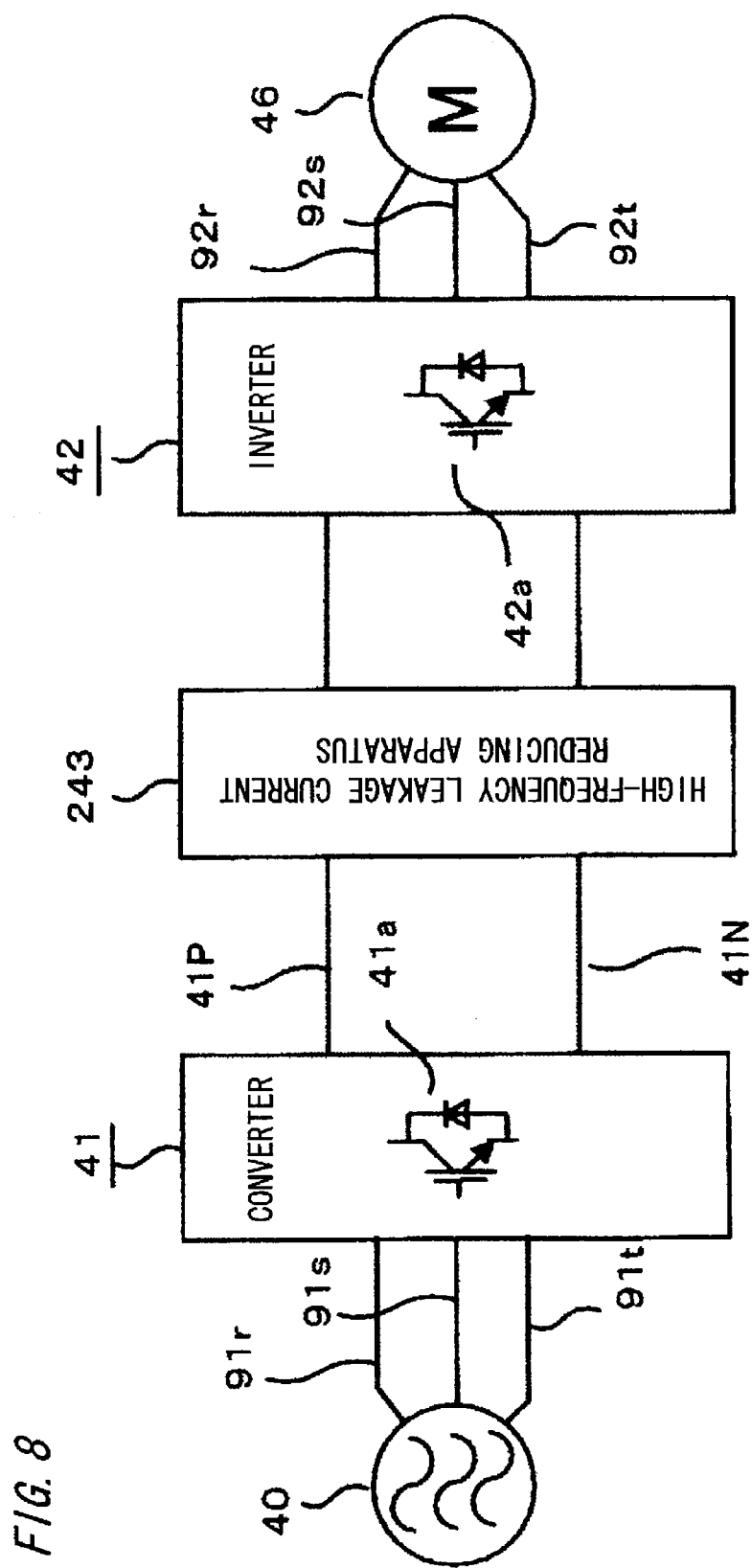
FIG. 8 is a connection diagram showing a connection example of the high-frequency leakage current reducing apparatus according to embodiment 3 of the present invention.

FIGS. 7 and 8 show embodiment 3, and FIG. 7 is a configuration diagram showing the configuration of a high-frequency leakage current reducing apparatus, and FIG. 8 is a connection diagram showing a connection example of the high-frequency leakage current reducing apparatus in FIG. 7. In FIG. 7, since a high-frequency leakage current reducing apparatus 243 is provided on the DC side, two main windings in which DC current flows are provided. Thus, the configuration of the high-frequency leakage current reducing apparatus 243 is slightly different from those of the high-frequency leakage current reducing apparatuses 43 and 143 provided on the AC side shown in FIGS. 1 and 6, but has the same function. Hereinafter, the detailed configuration of the high-frequency leakage current reducing apparatus 243 will be described. In FIG. 7, the high-frequency leakage current reducing apparatus 243 includes a common mode transformer 201 as a voltage detection section, a current injection circuit 202 as a current supply section, a filter apparatus 206, a voltage amplifier 203, and a power supply apparatus 230. It is noted that in the present embodiment, the output capacitor 8 in FIG. 1 is omitted.

As shown in FIG. 8, in a system that supplies power from the AC power supply 40 to the three-phase motor 46 as a load, the high-frequency leakage current reducing apparatus 243 is provided between the converter 41 as a first electric apparatus and the inverter 42 as a second electric apparatus, via the connection lines 41P and 41N as DC bus lines connecting the converter 41 and the inverter 42, and reduces common mode current J11 which is high-frequency leakage current flowing from the converter 41 to the connection lines 41P and 41N.

AC power from the AC power supply 40 is inputted to the converter 41 through the connection lines 91r, 91s, and 91t. The converter 41 converts three-phase AC current to variable-voltage DC current, and the obtained DC power is inputted to the inverter 42 through the connection lines 41P and 41N as DC bus lines. The inverter 42 converts the DC current to variable-voltage and variable-frequency three-phase AC current, and then the output of the inverter 42 is supplied to the three-phase motor 46 through the connection lines 92r, 92s, and 92t as AC output lines.

It is noted that in FIG. 8, the ground line 100N in FIG. 2 is not shown but each apparatus is assumed to be grounded.

As shown in FIG. 7, the common mode transformer 201 has DC windings 211 and 212 as main windings, and a winding 214 for common mode voltage detection as a winding for voltage detection. The main windings 211 and 212 of the common mode transformer 201 are connected in series to the connection lines 41P and 41N, and the current injection circuit 202 is connected to the connection lines 41P and 41N on the inverter side with respect to the common mode transformer 201.

The windings 211 and 212 and the winding 214 of the common mode transformer 201 are each composed of a predetermined number of turns (in the present embodiment, five turns) of wire wound on an iron core not shown. It is noted that the windings 211, 212, and 214 are wound so as to have polarities indicated by black filled circles in FIG. 8.

The current injection circuit 202 is composed of capacitors 221 and 222 for common mode voltage application and a ground resistor 224 which are connected to each other. Specifically, terminals on one side of the capacitors 221 and 222 are respectively connected to the DC connection lines 41P and 41N, and terminals on the other side are commonly connected to a neutral point 202N. The neutral point 202N is grounded via the ground resistor 224. The voltage amplifier 203 is composed of DC voltage terminals 203a and 203b and an operational amplifier having an FET 203d as a semiconductor device for voltage amplification. The voltage amplifier 203 is supplied with operation power from the power supply apparatus 230 described later via the DC voltage terminals 203a and 203b.

Output voltage V11 of the winding 214 for common mode voltage detection is supplied as voltage V12 via the filter apparatus 206 to the positive input terminal of the voltage amplifier 203 so that the voltage is amplified, and then the amplified voltage is applied as output voltage V13 to the connection point between the ground resistor 224 and the connection point 202N of the capacitors 221 and 222. It is noted that one terminal of the winding 214 for common mode voltage detection is grounded. In addition, the filter apparatus 206 is the same as the filter apparatus 6 shown in FIG. 1.

The power supply apparatus 230 converts DC power from the connection lines 41P and 41N to DC voltages at two levels of a positive one and a negative one, and supplies the DC voltages as operation power to the voltage amplifier 203. In the power supply apparatus 230, a zener diode 233 is connected in parallel to the series circuit composed of a capacitor 234 and a capacitor 235, and DC voltage terminals 230a and 230b are connected to the zener diode 233. The capacitor 234 side of the series circuit of the capacitor 234 and the capacitor 235 is connected to the connection line 41P, and the capacitor 235 side of the series circuit of the capacitor 234 and the capacitor 235 is connected to the connection line 41N. The connection point between the capacitor 234 and the capacitor 235 is grounded.

It is desirable that the power supply apparatus 230 receives power from the connection lines 41P and 41N on the converter 41 side. If the power reception point is on the converter 41 side with respect to the current injection circuit 202, the common mode current J1 flowing in the connection lines 41P and 41N has been reduced. Therefore, noise flowing into the voltage amplifier 203 via the power supply apparatus 230 can be reduced, and the reliability of the high-frequency leakage current reducing apparatus 243 is improved.

In addition, in order to prevent voltage variation between the connection lines 41P and 41N to which the power supply apparatus 230 is connected from influencing the inverter 42 side via the voltage amplifier 203, a reactor, a resistor, or the like may be provided between the connection line 41P and the zener diode 233, to form a filter.

Further, the power supply apparatus 230 may receive power from the connection lines 41P and 41N on the inverter 42 side with respect to the current injection circuit 202.

The operation of the high-frequency leakage current reducing apparatus 243 configured as described above is almost the same as that of the high-frequency leakage current reducing apparatus 43 shown in FIG. 1, and will be briefly described. The common mode voltage V11 generated by the common mode current J11 flowing from the converter 41 to the connection lines 41P and 41N is detected by the common mode transformer 201. Then, the common mode voltage V11 is adjusted with respect to the gain and the phase thereof for each frequency by the filter apparatus 206, and is inputted as the voltage V12 to the voltage amplifier 203. Then, the output voltage V13 obtained by amplifying the voltage V12 in the voltage amplifier 203 is applied to the connection point 202N of the capacitors 221 and 222 of the current injection circuit 202. At this time, by adjusting the output voltage V13, the voltage amplifier 203 adjusts the inter-terminal voltages of the capacitors 221 and 222 such that current J13 having the same phase as that of the common mode current J11 which is high-frequency leakage current is supplied from the connection lines 41P and 41N to the inverter 42 via the capacitors 221 and 222.

At this time, the voltage amplifier 203 controls the output voltage V13 through open/close control for the FET 203d of the voltage amplifier 203 so as to make the common mode current J11 approach zero. Therefore, most of the common mode current J12 flowing from the connection lines 41P and 41N to the inverter 42 is supplied as the current J13 from the voltage amplifier 203 via the current injection circuit 202, so that the common mode current J11 flowing from the converter 41 to the connection lines 41P and 41N can be reduced to substantially zero.

In the present embodiment, since the high-frequency leakage current reducing apparatus 243 is connected between the converter 41 and the inverter 42, two connection lines 41P and 41N are used for the connection, thus reducing the number of the main windings 211 and 212 of the common mode transformer 201. Therefore, the size and the cost of the apparatus configuration of the high-frequency leakage current reducing apparatus 243 can be reduced.

Embodiment 4

Figure 9:
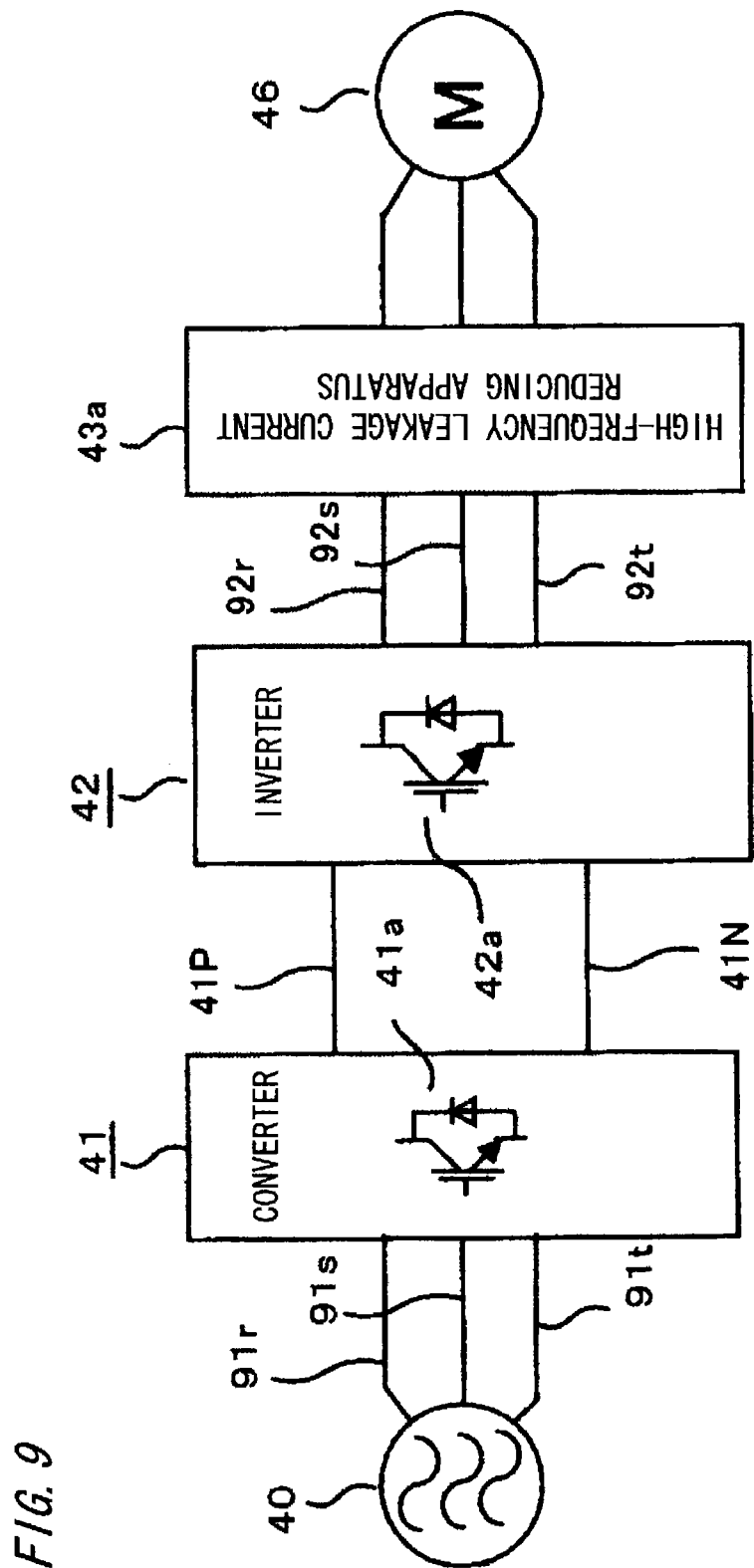
FIG. 9 is a connection diagram showing a connection example of a high-frequency leakage current reducing apparatus according to embodiment 4 of the present invention.

FIG. 9 shows embodiment 4 and is a connection diagram showing a connection example of a high-frequency leakage current reducing apparatus 43a.

In a system that supplies power from the AC power supply 40 to the three-phase motor 46 as a load, the high-frequency leakage current reducing apparatus 43a is provided between the inverter 42 as a first electric apparatus and the three-phase motor 46 as a second electric apparatus, via the connection lines 92r, 92s, and 92t connecting the inverter 42 and the three-phase motor 46, and reduces common mode current which is high-frequency leakage current flowing from the inverter 42 to the connection lines 92r, 92s, and 92t. The high-frequency leakage current reducing apparatus 43a has the same function as that of the high-frequency leakage current reducing apparatus 43 in FIG. 1 described in the above embodiment 1, though the specifications are slightly different therebetween.

AC power from the AC power supply 40 is inputted to the converter 41 through the connection lines 91r, 91s, and 91t. The converter 41 converts three-phase AC current to variable-voltage DC current, and the obtained DC power is inputted to the inverter 42 through the connection lines 41P and 41N as DC bus lines. The inverter 42 converts the DC current to variable-voltage and variable-frequency three-phase AC current, and the output of the inverter 42 is supplied to the three-phase motor 46 through the connection lines 92r, 92s, and 92t as AC output lines.

It is noted that in FIG. 9, the ground line 100N in FIG. 2 is not shown but each apparatus is assumed to be grounded.

Also in this case, a DC power supply for operation of the voltage amplifier 3 can be obtained by receiving power from the connection lines 91r, 91s, and 91t as in the above embodiment 2.

In the above embodiments, the windings 11, 12, and 13, the winding 14, the windings 211 and 212, and the winding 214 of the common mode transformers 1 and 201 are each composed of the same number of turns of wire, i.e., five turns of wire wound on an iron core not shown. However, the windings are not limited thereto. For example, the number of turns of the winding 14 for common mode voltage detection may be N times of the number of turns of the windings 11, 12, and 13. In this case, the detected value of the common mode voltage is V1×N. The same applies to the common mode transformer 201.

Thus, if the detection value of the common mode voltage is increased N times, that is, if the number of turns of the winding 14 for common mode voltage detection is set to be larger than the number of turns of the windings 11, 12, and 13 to increase the detected voltage V1, the gain G of the voltage amplifier 3 can be set at a relatively small value, whereby occurrence of gain error or offset error in the voltage amplifier 3 can be suppressed. In addition, even in the case where the common mode transformer 1 having a small size and a small impedance is used, if the turns ratio N is set at a large value, a sufficiently large common mode voltage can be detected.

In the above embodiments, the case where the common mode transformer 1 has the windings 11 to 13 and 14 each wound on an iron core, has been described. However, the windings are not limited thereto. For example, the winding 14 for common mode voltage detection may be wound on a ring-shaped iron core through which the connection lines 91r, 91s, and 91t penetrate, and also in this case, the same effect can be provided. In addition, similarly, also in the common mode transformer 201, the winding 214 for common mode voltage detection may be wound on a ring-shaped iron core through which the connection lines 41P and 41N penetrate.

Embodiment 5

In the above embodiments, the case where the filter apparatus has at least one filter circuit and adjusts the gain and the phase for each frequency, has been described. In the present embodiment, specific configurations of the filter apparatus and the voltage amplifier will be described.

Figure 10:
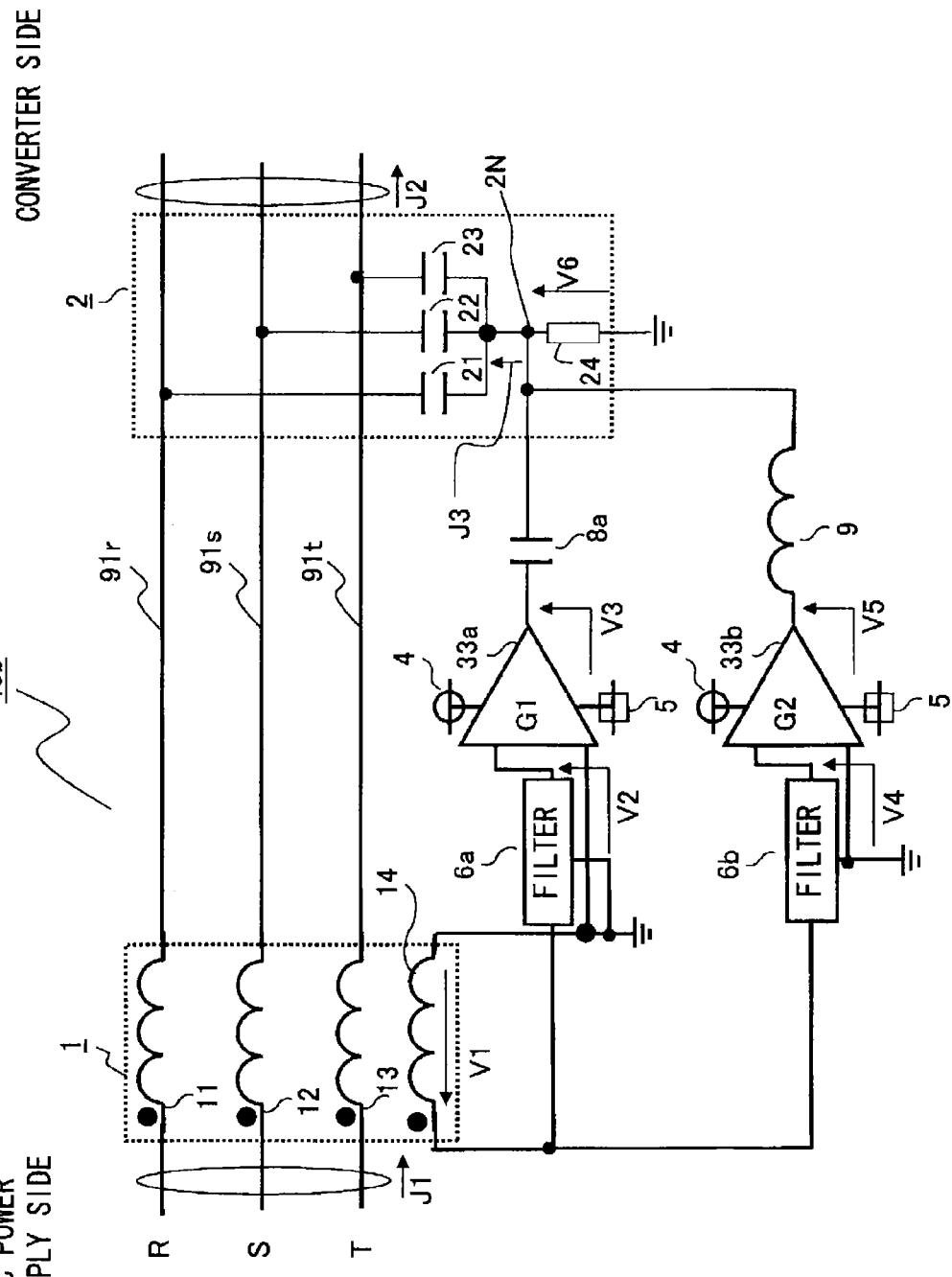
FIG. 10 is a configuration diagram showing the configuration of a high-frequency leakage current reducing apparatus according to embodiment 5 of the present invention.

FIG. 10 is a configuration diagram showing the configuration of a high-frequency leakage current reducing apparatus according to embodiment 5. In FIG. 10, a high-frequency leakage current reducing apparatus 43b as a leakage current reducing apparatus includes: the common mode transformer 1 as a voltage detection section; the current injection circuit 2 as a current supply section; filter circuits 6a and 6b composing the filter apparatus; voltage amplifier circuits 33a and 33b composing the voltage amplifier; and a capacitor 8a and a reactor 9 as output filters provided on the output side of the voltage amplifier circuits 33a and 33b.

It is noted that the entire configuration and operation, and the effect obtained by them, of the high-frequency leakage current reducing apparatus 43b, other than the specific filter apparatus, the specific voltage amplifier, and the specific output filter, are the same as those of the above embodiment 1. That is, as in the above embodiment 1, the high-frequency leakage current reducing apparatus 43b is provided between the AC power supply 40 and the converter 41 via the three-phase connection lines 91r, 91s, and 91t connecting the AC power supply 40 and the converter 41, and reduces the common mode current J1 which is high-frequency leakage current flowing from the AC power supply 40 to the connection lines 91r, 91s, and 91t.

As shown in FIG. 10, the high-frequency leakage current reducing apparatus 43b includes: two filter circuits 6a and 6b which respectively restrict pass of different frequency components with respect to the common mode voltage V1 detected by the common mode transformer 1; the voltage amplifier circuit 33a which amplifies the output voltage V2 of the filter circuit 6a by a factor of the gain (G1) to generate the output voltage V3; the voltage amplifier circuit 33b which amplifies the output voltage V4 of the filter circuit 6b by a factor of the gain (G2) to generate output voltage V5; the capacitor 8a which is an output filter for the voltage amplifier circuit 33a; and the reactor 9 which is an output filter for the voltage amplifier circuit 33b.

A phenomenon that the voltage amplifier circuits 33a and 33b amplify noise current which is a reduction target occurs at a phase inverting frequency at which, due to characteristics such as the impedance of a circuit to which each of the voltage amplifier circuits 33a and 33b is connected and the delay time of an operational amplifier (not shown) included in each of the voltage amplifier circuits 33a and 33b, the phase of current outputted by the voltage amplifier circuits 33a and 33b inverts from the phase of the common mode current J1 flowing in the three-phase connection lines 91r, 91s, and 91t. Similarly, as factors for amplifying noise, the common mode voltage V1 also includes noise of frequency components such as: a resonance frequency due to the impedance of the lines, the common mode transformer 1, or the like; and when the inverter 42 is connected, a low-frequency region such as a frequency close to the carrier frequency of the inverter 42, which does not need to be eliminated.

Each of the filter circuits 6a and 6b decreases the gain for the above frequency band, to reduce only noise in a frequency band as a reduction target without amplifying noise. In the present embodiment, the filter circuit 6a ensures the gain in a high-frequency band equal to or higher than the resonance frequency, and the filter circuit 6b ensures the gain in a low-frequency band equal to or lower than the resonance frequency.

That is, the common mode voltage V1 detected by the common mode transformer 1 are adjusted with respect to the gain and the phase thereof for each frequency in a high-frequency band by the filter circuit 6a, and the resultant voltage is outputted as the voltage V2. The voltage V2 is amplified by a factor of the gain (G1) in the voltage amplifier circuit 33a, and then outputted as the voltage V3. The output voltage V3 passes through the capacitor 8a, whereby a DC component is eliminated, and then a high-frequency component is applied to the neutral point 2N.

In addition, the common mode voltage V1 is also inputted to the filter circuit 6b. In the filter circuit 6b, the gain and the phase thereof are adjusted for each frequency in a low-frequency band, and the resultant voltage is outputted as the voltage V4. The voltage V4 is amplified by a factor of the gain (G2) in the voltage amplifier circuit 33b, and then outputted as the voltage V5. The output voltage V5 passes through the reactor 9, whereby a high-frequency component is eliminated, and then a low-frequency component is applied to the neutral point 2N.

It is noted that the capacitor 8a is set so as to pass only the pass frequency band of the filter circuit 6a, that is, a high-frequency band, and the reactor 9 is set so as to pass the pass frequency band of the filter circuit 6b, that is, a low-frequency band. In addition, owing to the capacitor 8a and the reactor 9 provided as the output filters, even though the output of each of the voltage amplifier circuits 33a and 33b is connected to the neutral point 2N, mutual interference between the voltage amplifier circuits 33a and 33b can be reduced.

Then, the current injection circuit 2 applies the voltages outputted via the capacitor 8a and the reactor 9 from the voltage amplifier circuits 33a and 33b, to the neutral point 2N of the capacitors 21, 22, and 23. The applied voltage V6 is generated so as to have the same phase as that of the common mode voltage V1.

By change in the inter-terminal voltages of the capacitors 21, 22, and 23 of the current injection circuit 2, the current J3 having the same phase as that of the common mode current J1 which is high-frequency leakage current is supplied as the output of the voltage amplifier circuit to the converter 41.

It is noted that the above-described matter is equivalent to that the inductance of the common mode transformer 1 is amplified by a factor of the gain adjusted for each frequency by the filter circuits 6a and 6b and the voltage amplifier circuits 33a and 33b, and the resultant inductance is generated between the common mode transformer 1 and the current injection circuit 2.

In addition, at this time, the voltage amplifier circuits 33a and 33b respectively control the output voltages V3 and V5 through open/close control for the semiconductor devices included therein so as to make the common mode current J1 approach zero.

In the present embodiment, by using a plurality of filter circuits 6a and 6b and a plurality of voltage amplifier circuits 33a and 33b, the gains and the phases are adjusted for each frequency by the filter circuits 6a and 6b, whereby only noise in a frequency band as a reduction target can be reliably reduced without amplifying noise. In addition, by dividing a frequency band for which the voltage amplifier circuits 33a and 33b perform amplification, a plurality of voltage amplifier circuits 33a and 33b can be driven in parallel irrespective of a problem due to the difference in characteristics between the voltage amplifier circuits 33a and 33b. Therefore, large common mode current (current J3) can be supplied.

In addition, by adjusting the constants of the filter circuits 6a and 6b, it is possible to adjust the phase inverting frequency at which the phases of the voltages V3 and V5 outputted from the voltage amplifier circuits 33a and 33b invert from the phase of the common mode voltage V1, thereby adjusting the phase inverting frequency at which the phases of currents outputted from the voltage amplifier circuits 33a and 33b invert. Thus, tolerance is obtained for the gain in a frequency band at which the phase inverts, and the gains of the voltage amplifier circuits 33a and 33b for noise in a frequency band as a reduction target can be set to be large, whereby stable operation can be performed.

Further, if the phase inverting frequencies at which the phases of the voltages V3 and V5 outputted from the voltage amplifier circuits 33a and 33b invert from the phase of the common mode voltage V1 are configured so as not to coincide with each other, noise of a frequency that cannot be amplified by the voltage amplifier circuit 33a is amplified by the voltage amplifier circuit 33b, and on the other hand, the noise of a frequency that cannot be amplified by the voltage amplifier circuit 33b is amplified by the voltage amplifier circuit 33a, whereby noise reduction effect can be obtained in wide frequency band.

Regarding the above frequency band, the filter constant is adjusted such that the frequency band becomes, for example, a frequency band equal to or higher than 150 kHz which is a frequency band defined by the noise standard, or a frequency band in which a large level of a noise component is indicated based on a result of measurement of noise of the system or the bus lines. Thus, noise due to leakage current in such frequency bands can be effectively reduced.

It is noted that in accordance with a noise occurrence condition, only necessary one of the filter circuit 6a and the capacitor 8a may be provided by adjusting the circuit constant thereof. Similarly, only necessary one of the filter circuit 6b and the reactor 9 may be provided by adjusting the circuit constant thereof.

In addition, in the above embodiment, the filter circuit 6a ensures the gain in a high-frequency band equal to or higher than the resonance frequency, and the filter circuit 6b ensures the gain in a low-frequency band equal to or lower than the resonance frequency. However, a high-frequency band and a low-frequency band may be separated by the phase inverting frequency at which the phases of the voltages V3 and V5 outputted from the voltage amplifier circuits 33a and 33b invert from the phase of the common mode voltage V1, thereby realizing effective noise reduction. That is, the constants of the filter circuits 6a and 6b are adjusted such that the filter circuit 6a ensures the gain in a frequency band higher than the phase inverting frequency at which the phase of the voltage V3 inverts from the phase of the common mode voltage V1, and the filter circuit 6b ensures the gain in a frequency band higher than the phase inverting frequency at which the phase of the voltage V5 inverts from the phase of the common mode voltage V1.

Embodiment 6

Figure 11:
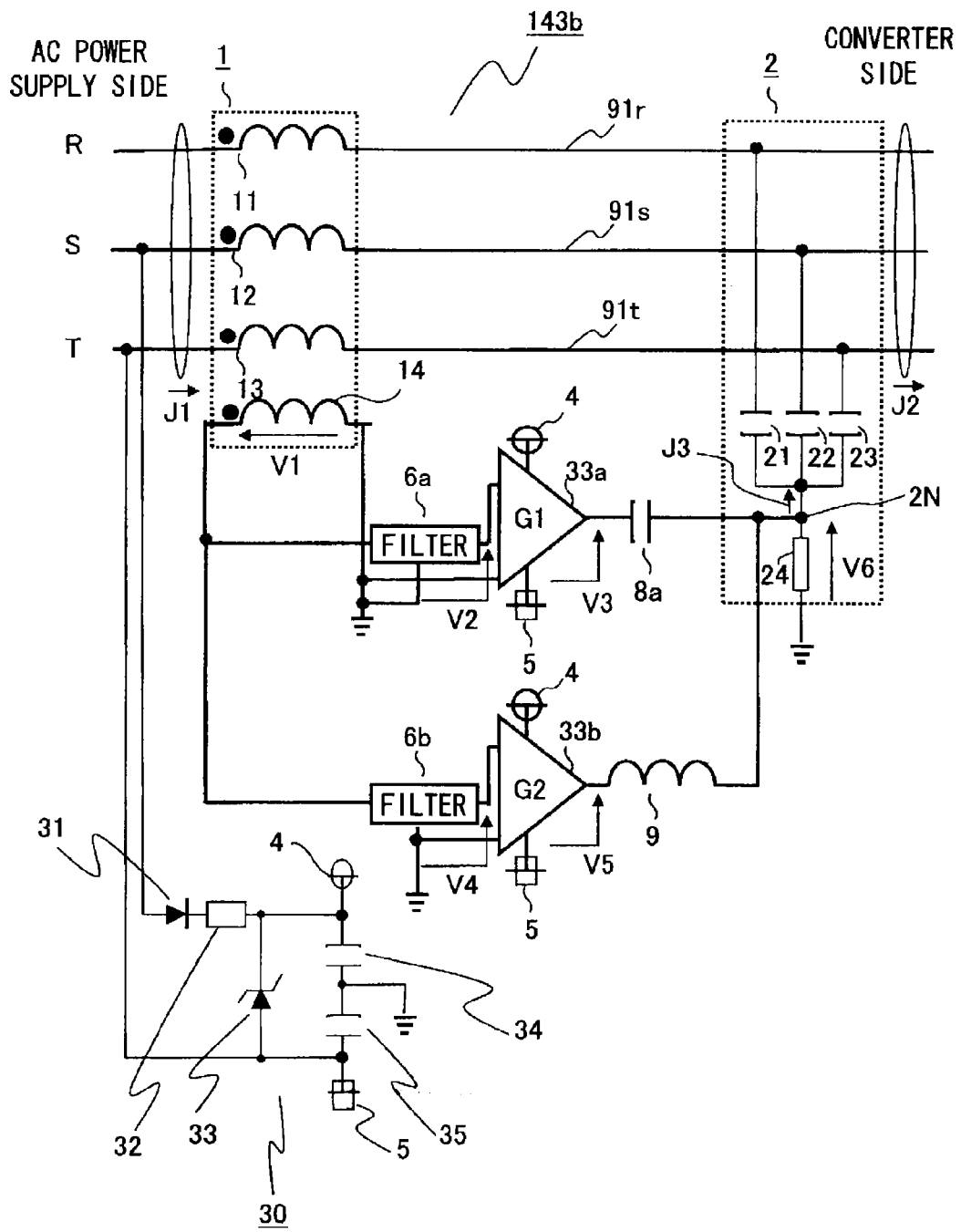
FIG. 11 is a configuration diagram showing the configuration of a high-frequency leakage current reducing apparatus according to embodiment 6 of the present invention.

FIG. 11 is a configuration diagram showing the configuration of a high-frequency leakage current reducing apparatus according to embodiment 6. In FIG. 11, a high-frequency leakage current reducing apparatus 143b as a leakage current reducing apparatus is used instead of the high-frequency leakage current reducing apparatus 43b shown in FIG. 10, and has the same rectification power supply apparatus 30 as in the above embodiment 2. It is noted that the other configuration is the same as that of the above embodiment 5.

The rectification power supply apparatus 30 converts AC power from the connection lines 91s and 91t to DC voltages at two levels of a positive one and a negative one, and supplies the DC voltages as operation power to the voltage amplifier circuits 33a and 33b. In the rectification power supply apparatus 30, the anode side of the diode 31 is connected to the S-phase connection line 91s, and the cathode side is connected via the resistor 32 to the capacitor 34 side of the series circuit composed of the capacitor 34 and the capacitor 35. The capacitor 35 side of the series circuit of the capacitor 34 and the capacitor 35 is connected to the T-phase connection line 91t, and the connection point between the capacitor 34 and the capacitor 35 is grounded. In addition, the zener diode 33 is connected in parallel to the series circuit of the capacitor 34 and the capacitor 35, and is connected to the DC voltage terminals 4 and 5.

AC voltage generated between the S-phase and T-phase connection lines 91s and 91t is processed through half-wave rectification by the diode 31, and then divided by the resistor 32 and the zener diode 33, thereby obtaining two DC voltages having different voltage levels for driving the voltage amplifier 3 on both DC voltage terminals 4 and 5 of the series circuit of the capacitor 34 and the capacitor 35. The DC voltage terminals 4 and 5 are connected to the power supply terminals of the voltage amplifier circuits 33a and 33b, to supply operation power to the voltage amplifier circuits 33a and 33b.

Also in the present embodiment, as in the above embodiment 2, since DC power supply for driving the voltage amplifier circuits 33a and 33b is obtained by receiving AC power from the connection lines 91s and 91t, an insulation transformer or a flyback converter is not needed, so that the size and the cost of a power supply part can be reduced. Also in this case, it is desirable that the rectification power supply apparatus 30 receives power from the connection lines 91s and 91t on the AC power supply 40 side. If the power reception point is on the AC power supply 40 side with respect to the current injection circuit 2, the common mode current J1 flowing in the connection lines 91s and 91t has been reduced. Therefore, noise flowing into the voltage amplifier 3 via the rectification power supply apparatus 30 can be reduced, and the reliability of the high-frequency leakage current reducing apparatus 143 is improved.

In addition, as in the above embodiment 2, DC power supply may be obtained through rectification from the connection lines 91r, 91s, and 91t. Further, power can be also received from a connection line other than the connection lines 91s and 91t on the AC power supply 40 side.

Embodiment 7

In the above embodiment 5, specific configurations of the filter apparatus and the voltage amplifier have been described. In the present embodiment, other specific configurations of the filter apparatus and the voltage amplifier will be described.

Figure 12:
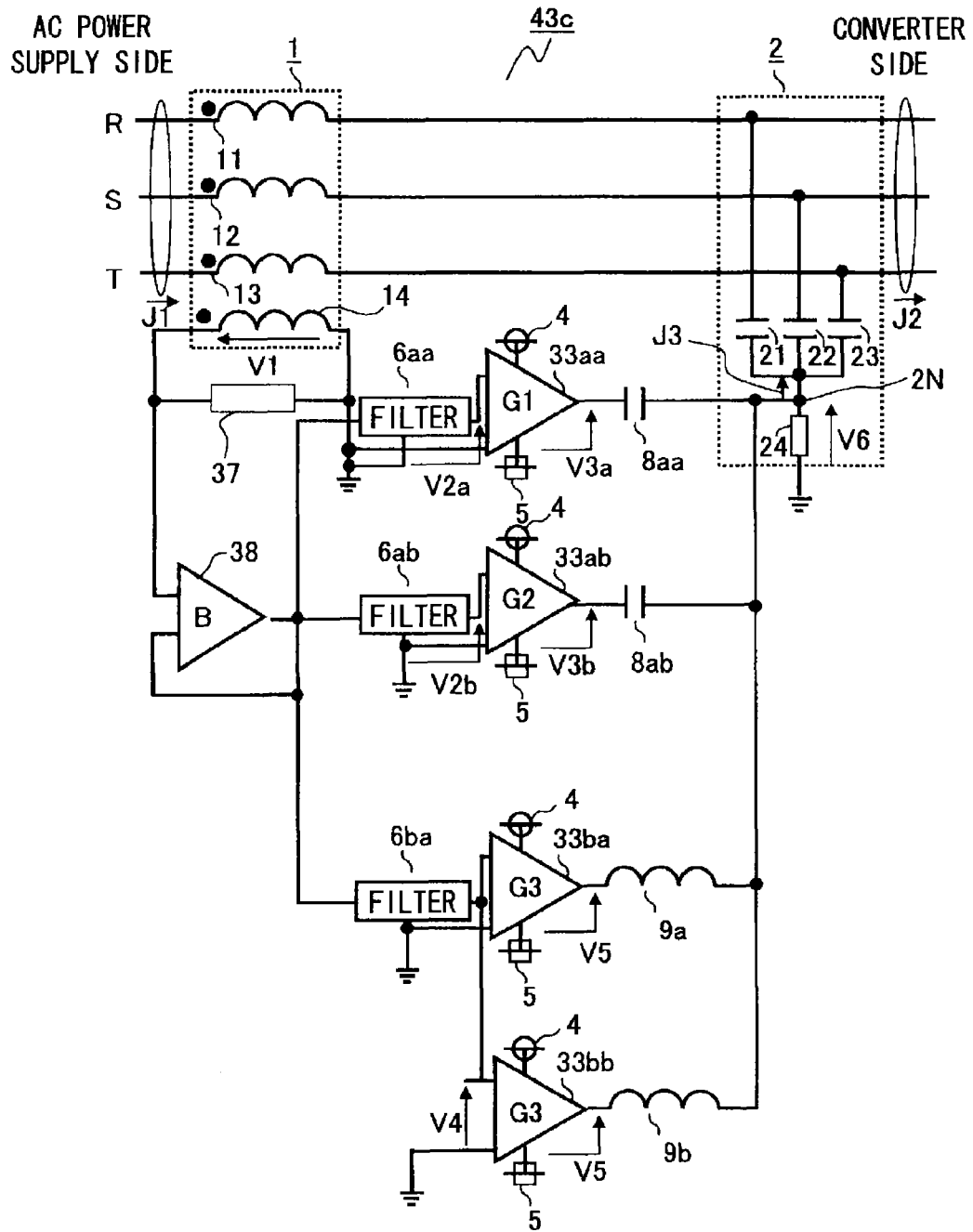
FIG. 12 is a configuration diagram showing the configuration of a high-frequency leakage current reducing apparatus according to embodiment 7 of the present invention.

FIG. 12 is a configuration diagram showing the configuration of a high-frequency leakage current reducing apparatus according to embodiment 7. In FIG. 12, a high-frequency leakage current reducing apparatus 43c as a leakage current reducing apparatus includes: the common mode transformer 1 as a voltage detection section; the current injection circuit 2 as a current supply section; two first filter circuits 6aa and 6ab and a second filter circuit 6ba composing the filter apparatus; and two first voltage amplifier circuits 33aa and 33ab and two second voltage amplifier circuits 33ba and 33bb composing the voltage amplifier. In addition, the high-frequency leakage current reducing apparatus 43c includes capacitors 8aa and 8ab as output filters provided on the output sides of the first voltage amplifier circuits 33aa and 33ab, and reactors 9a and 9b as output filters provided on the output sides of the second voltage amplifier circuits 33ba and 33bb.

In addition, a resistor 37 is connected to the output of the common mode transformer 1 such that the voltage V1 proportional to the common mode current J1 is generated. Further, the voltage V1 is inputted to a buffer circuit 38, and then the output of the buffer circuit 38 is inputted to the first filter circuits 6aa and 6ab and the second filter circuit 6ba. It is noted that in the case where the input impedances of the filter circuits 6aa, 6ab, and 6ba are large so that large error does not occur on the voltage V1 detected by the common mode transformer 1, such as a case where the first filter circuits 6aa and 6ab and the second filter circuit 6ba have a function equivalent to the buffer circuit 38 or are composed of digital circuits, the buffer circuit 38 is not needed.

It is noted that the entire configuration and operation, and the effect obtained by them, of the high-frequency leakage current reducing apparatus 43b, other than the above configuration, are the same as those of the above embodiment 1. That is, as in the above embodiment 1, the high-frequency leakage current reducing apparatus 43c is provided between the AC power supply 40 and the converter 41 via the three-phase connection lines 91r, 91s, and 91t connecting the AC power supply 40 and the converter 41, and reduces the common mode current J1 which is high-frequency leakage current flowing from the AC power supply 40 to the connection lines 91r, 91s, and 91t.

One first voltage amplifier circuit 33aa is connected for reducing noise in a high-frequency band corresponding to a frequency f1 higher than a phase inverting frequency that amplifies the common mode current J1. Therefore, the first filter circuit 6aa and the capacitor 8aa which are filters connected to the input and the output of the first voltage amplifier circuit 33aa have characteristics that they pass a signal and power having the frequency f1 higher than the phase inverting frequency. Next, the other first voltage amplifier circuit 33ab is connected for reducing noise in a frequency band corresponding to a frequency f2 lower than the phase inverting frequency. Therefore, the first filter circuit 6ab and the capacitor 8ab which are filters connected to the input and the output of the first voltage amplifier circuit 33ab have characteristics that they pass a signal and power having the frequency f2 lower than the phase inverting frequency.

In addition, the two second voltage amplifier circuits 33ba and 33bb are connected for reducing noise in a frequency band corresponding to, of the frequencies f2 lower than the above phase inverting frequency, a frequency f3 lower than a predetermined frequency F defined by the standard, for example. Therefore, the second filter circuit 6ba and the reactors 9a and 9b which are filters connected to the inputs and the outputs of the respective second voltage amplifiers circuit 33ba and 33bb have characteristics that they pass a signal and power having the frequency f3 in the low-frequency band.

That is, the common mode voltage V1 detected by the common mode transformer 1 is inputted to the first filter circuits 6aa and 6ab and the second filter circuit 6ba via the buffer circuit 38.

The first filter circuits 6aa and 6ab pass a high frequency equal to or higher than the predetermined frequency F. One first filter circuit 6aa passes a signal and power having the frequency f1 higher than the phase inverting frequency, and the other first filter circuit 6ab passes a signal and power having the frequency f2 lower than the phase inverting frequency. In this case, the first filter circuit 6ab also passes a frequency component lower than the frequency F.

Then, the first filter circuit 6aa outputs voltage V2a, the voltage V2a is amplified by a factor of the gain (G1) in the first voltage amplifier circuit 33aa, and the amplified voltage is outputted as voltage V3a. The output voltage V3a passes through the capacitor 8aa, whereby a DC component is eliminated, and then a high-frequency component is applied to the neutral point 2N. In addition, the first filter circuit 6ab outputs voltage V2b, the voltage V2b is amplified by a factor of the gain (G2) in the first voltage amplifier circuit 33ab, and the amplified voltage is outputted as voltage V3b. The output voltage V3b passes through the capacitor 8ab, whereby a DC component is eliminated, and then a high-frequency component is applied to the neutral point 2N.

The second filter circuit 6ba passes a signal and power having the frequency f3 lower than the predetermined frequency F, and outputs voltage V4 which is to be inputted to the two second voltage amplifier circuits 33ba and 33bb provided in parallel. In this case, the two second voltage amplifier circuits 33ba and 33bb have the same configuration, each amplifying the voltage V4 by a factor of the gain (G3), thereby outputting the voltage V5. The outputs of the second voltage amplifier circuits 33ba and 33bb respectively pass through the reactors 9a and 9b, whereby a high-frequency component is eliminated, and then a low-frequency component is applied to the neutral point 2N.

Then, the current injection circuit 2 applies the voltages outputted via the capacitors 8aa and 8ab and the reactors 9a and 9b from the voltage amplifier circuits 33aa, 33ab, 33ba, and 33bb, to the neutral point 2N of the capacitors 21, 22, and 23. The applied voltage V6 is generated so as to have the same phase as that of the common mode voltage V1.

By change in the inter-terminal voltages of the capacitors 21, 22, and 23 of the current injection circuit 2, the current J3 having the same phase as that of the common mode current J1 which is high-frequency leakage current is supplied from the connection lines 91r, 91s, and 91t in the system to the converter 41.

As described above, in a plurality of first voltage amplifier circuits 33aa and 33ba which amplifies a high frequency component, the operation frequency band is divided therebetween, whereby the output power of the first voltage amplifier circuits 33aa and 33ba can be suppressed, and the size and the cost of the apparatus configuration can be reduced.

In addition, in a low frequency region, a plurality of second voltage amplifier circuits 33ba and 33bb are connected in parallel, whereby large noise current can be also dealt with.

It is noted that the capacitors 8aa and 8ab and the reactors 9a and 9b which are the output filters of the voltage amplifier circuits 33aa, 33ab, 33ba, and 33bb are respectively set so as to pass only the pass frequency bands of the corresponding filter circuits 6aa, 6ab, and 6ba. In addition, owing to the capacitors 8aa and 8ab and the reactors 9a and 9b provided as these output filters, mutual interference among the voltage amplifier circuits 33aa, 33ab, 33ba, and 33bb can be reduced, and a desired voltage V6 can be applied to the neutral point 2N.

In this case, even if signals inputted to the second voltage amplifier circuits 33ba and 33bb connected in parallel are the same, it is desirable that the reactors 9a and 9b are provided on the output side. Specifically, it is possible to suppress short circuit between the second voltage amplifier circuits 33ba and 33bb, and adverse influence on the first voltage amplifier circuits 33aa and 33ab which output other frequencies. In the case where the above adverse influence does not occur, the outputs of the two second voltage amplifier circuits 33ba and 33bb may be connected to one reactor, and may be connected via the one reactor to the current injection circuit 2.

In addition, as shown in FIG. 5, in the case where one phase of the input system is grounded, in order that abnormal voltage will not be applied to the voltage amplifier circuits 33aa, 33ab, 33ba, and 33bb, a low frequency such as a power supply frequency is to be prevented from being applied to the output terminals of the voltage amplifier circuits 33aa, 33ab, 33ba, and 33bb. For this purpose, a filter configuration is used that, by using the capacitors 21, 22, and 23 and the ground resistor 24 of the current injection circuit 2 or the capacitors 8aa and 8ab which are the output filters, voltage in the above power supply frequency band is prevented from being applied to the output terminals of the voltage amplifier circuits 33aa, 33ab, 33ba, and 33bb from the current injection circuit 2 side. Thus, even in the case where one phase of the input system is grounded, the high-frequency leakage current reducing apparatus 43c can normally operate.

In addition, since the phase inverting frequencies of the respective circuits can be adjusted by the filter circuits 6aa, 6ab, and 6ba, a plurality of voltage amplifier circuits 33aa, 33ab, 33ba, and 33bb can perform mutual interpolation for noise in each others' phase inverting frequencies, whereby noise in a wide frequency band can be reduced without missing any noise.

In addition, in the present embodiment, the case where the voltage amplifier is composed of three kinds of and a total of four voltage amplifier circuits 33aa, 33ab, 33ba, and 33bb, has been described. However, this circuit configuration is merely an example. The range of frequencies as a noise reduction target may be divided in a way other than the above-described frequency division, or the constants of input filters and output filters or the number of voltage amplifier circuits to be used may be changed depending on the magnitude of noise current in the divided frequency band.

The invention claimed is:

1. A leakage current reducing apparatus which is provided between a first electric apparatus and a second electric apparatus, via a plurality of connection lines connected between the first and the second electric apparatuses, and reduces leakage current flowing from the first electric apparatus to the connection lines, the leakage current reducing apparatus comprising:
    a voltage detection section having main windings connected in series to the connection lines, and a winding for leakage current detection, and detecting, as detected voltage, the leakage current flowing from the first electric apparatus to the connection lines, by the winding for leakage current detection;
    a filter apparatus receiving the detected voltage;
    a voltage amplifier amplifying the output of the filter apparatus and outputting the amplified voltage as output voltage; and
    a current supply section provided, on the second electric apparatus side with respect to the voltage detection section, between the first and the second electric apparatuses, and supplying current having substantially the same phase as the phase of the leakage current, to the connection lines, wherein
    the current supply section has a plurality of injection capacitors whose terminals on one side are connected to the connection lines and whose terminals on the other side are commonly connected to a common connection point grounded via an impedance device, and applies the output voltage to the common connection point, thereby supplying the current having substantially the same phase as the phase of the leakage current from the injection capacitors to the connection lines.

2. The leakage current reducing apparatus according to claim 1, wherein the output voltage is controlled by the voltage amplifier so as to make the leakage current approach zero.

3. The leakage current reducing apparatus according to claim 2, wherein a power supply for driving the voltage amplifier is generated by power reception from the connection lines, and a power reception point on the connection lines is on the first electric apparatus side with respect to the current supply section.

4. The leakage current reducing apparatus according to claim 1, wherein the filter apparatus adjusts the amplitude and the phase of the detected voltage for each frequency.

5. The leakage current reducing apparatus according to claim 1, wherein the filter apparatus is composed of one filter whose pass frequency range can be adjusted or a plurality of filter circuits whose pass frequency ranges can be adjusted and which are connected in parallel or in series or connected in series and parallel in a multistage fashion.

6. The leakage current reducing apparatus according to claim 1, wherein the filter apparatus is set so as to restrict pass of, among frequency components of the detected voltage, a frequency component at which the phase of current outputted from the voltage amplifier inverts from the phase of the leakage current.

7. The leakage current reducing apparatus according to claim 6, wherein the filter apparatus is configured such that the constant thereof can be adjusted and the phase inverting frequency can be adjusted by adjustment of the constant.

8. The leakage current reducing apparatus according to claim 1, wherein
  the filter apparatus has a plurality of filter circuits which respectively restrict pass of different frequency components of the detected voltage that is inputted,
  the voltage amplifier has a plurality of voltage amplifier circuits which respectively receive and amplify the outputs of the filter circuits, and an output filter which reduces mutual interference among the voltage amplifier circuits, and
  the current supply section applies output voltage outputted via the output filter from each of the voltage amplifier circuits, to the common connection point.

9. The leakage current reducing apparatus according to claim 8, wherein the output filter is set so as to pass a frequency component only in a pass frequency band of the filter circuit on the voltage amplifier circuit input side that is connected to the output filter.

10. The leakage current reducing apparatus according to claim 8, wherein the filter apparatus has two filter circuits as the plurality of filter circuits, and the constant of each of the filter circuits is adjusted such that one of the filter circuits passes only a high-frequency component higher than a frequency at which the phase of the output voltage of each of the voltage amplifier circuits inverts from the phase of the detected voltage, and the other one of the filter circuits passes only a low-frequency component lower than the frequency.

11. The leakage current reducing apparatus according to claim 1, wherein in the current supply section, a phase inverting frequency at which the phase of the output voltage inverts from the phase of the detected voltage can be adjusted by adjustment of the capacitances of the injection capacitors.

12. The leakage current reducing apparatus according to claim 1, wherein
  one of the first and the second electric apparatuses is an inverter of a pulse width modulation type, and
  the filter apparatus restricts pass of, among frequency components of the detected voltage, a frequency component equal to or lower than a carrier frequency of the inverter.

13. The leakage current reducing apparatus according to claim 1, wherein the first electric apparatus is an AC power supply, and the second electric apparatus is a converter which converts AC power of the AC power supply to DC power.

14. The leakage current reducing apparatus according to claim 1, wherein the first electric apparatus is a converter which converts AC power to DC power, and the second electric apparatus is an inverter which converts the DC power from the converter to AC power.

\* \* \* \* \*